(12) United States Patent
Volpe et al.

(10) Patent No.: US 11,314,635 B1
(45) Date of Patent: Apr. 26, 2022

(54) TRACKING PERSISTENT MEMORY USAGE

(71) Applicant: Amazon Technologies, Inc., Seattle, WA (US)

(72) Inventors: Thomas A. Volpe, Austin, TX (US); Mark Anthony Banse, Austin, TX (US); Steven Scott Larson, Georgetown, TX (US)

(73) Assignee: Amazon Technologies, Inc., Seattle, WA (US)

( * ) Notice: Subject to any disclaimer, the term of this patent is extended or adjusted under 35 U.S.C. 154(b) by 443 days.

(21) Appl. No.: 15/838,934

(22) Filed: Dec. 12, 2017

(51) Int. Cl.
*G06F 3/06* (2006.01)
*G06F 12/02* (2006.01)
*G06F 11/34* (2006.01)
*G06F 12/1027* (2016.01)
*G06F 11/10* (2006.01)
*G06F 13/16* (2006.01)

(52) U.S. Cl.
CPC .......... *G06F 12/0246* (2013.01); *G06F 3/064* (2013.01); *G06F 3/0616* (2013.01); *G06F 3/0656* (2013.01); *G06F 3/0679* (2013.01); *G06F 11/1004* (2013.01); *G06F 11/3476* (2013.01); *G06F 12/1027* (2013.01); *G06F 13/1673* (2013.01)

(58) Field of Classification Search
CPC .. G06F 3/0679; G06F 12/0246; G06F 3/0616; G06F 3/064; G06F 3/0653; G06F 3/0656; G06F 11/1004; G06F 11/3476; G06F 12/0243
USPC ........................................................ 711/103
See application file for complete search history.

(56) References Cited

U.S. PATENT DOCUMENTS

| | | | |
|---|---|---|---|
| 5,150,465 A * | 9/1992 | Bush ..................... | G06F 3/0601 710/11 |
| 7,664,018 B2 * | 2/2010 | Warren ................. | H04L 12/433 370/230 |
| 8,880,788 B1 * | 11/2014 | Sundaram ............. | G06F 3/0688 711/103 |
| 9,329,789 B1 * | 5/2016 | Chu ........................ | G06F 3/064 |
| 9,858,964 B1 * | 1/2018 | Wei ........................ | G11B 5/012 |

(Continued)

OTHER PUBLICATIONS

A Log Buffer-Based Flash Translation Layer Using Fully-Associative Sector Translation by Lee (Year: 2007).*

(Continued)

*Primary Examiner* — Paul M Knight
(74) *Attorney, Agent, or Firm* — Weaver Austin Villeneuve & Samnson LLP

(57) ABSTRACT

Disclosed herein are techniques for tracking usage of a storage-class memory. In one embodiment, a method includes receiving a first statistics update entry and a second statistics update entry by a memory controller for a memory, and assembling the statistics update entries into a statistics log entry. The first statistics update entry indicates a number of operations performed on a first memory block in the memory, and the second statistics update entry indicates a number of operations performed on a second memory block in the memory. The method also includes determining a persistent memory region in a persistent memory for storing the statistics log entry, and writing the statistics log entry into the persistent memory region, where the statistics log entry persists in the persistent memory region until the statistics log entry is read back through the memory controller.

18 Claims, 12 Drawing Sheets

(56) References Cited

U.S. PATENT DOCUMENTS

| | | | | |
|---|---|---|---|---|
| 2002/0147882 | A1* | 10/2002 | Pua | G06F 3/0607 711/103 |
| 2011/0082963 | A1* | 4/2011 | Jeddeloh | G06F 12/0246 711/103 |
| 2011/0197107 | A1* | 8/2011 | Ou | G06F 11/1004 714/758 |
| 2011/0258363 | A1* | 10/2011 | Doatmas | G06F 3/0616 711/103 |
| 2011/0307667 | A1* | 12/2011 | Yano | G06F 12/0246 711/135 |
| 2012/0233523 | A1* | 9/2012 | Krishnamoorthy | G06F 11/1068 714/758 |
| 2012/0239871 | A1* | 9/2012 | Badam | G06F 12/0246 711/104 |
| 2012/0246540 | A1* | 9/2012 | Lee | G06F 12/0246 714/758 |
| 2013/0138870 | A1* | 5/2013 | Yoon | G11C 16/3495 711/103 |
| 2013/0173857 | A1* | 7/2013 | Cheon | G06F 3/064 711/103 |
| 2013/0332660 | A1* | 12/2013 | Talagala | G06F 12/0246 711/103 |
| 2014/0059279 | A1* | 2/2014 | He | G06F 12/0246 711/103 |
| 2015/0186072 | A1* | 7/2015 | Darragh | G06F 3/0653 711/103 |
| 2016/0011818 | A1* | 1/2016 | Hashimoto | G11C 16/3495 711/103 |
| 2016/0179422 | A1* | 6/2016 | Lee | G06F 11/10 711/103 |
| 2016/0357743 | A1* | 12/2016 | Swaminathan | G06F 16/2255 |
| 2016/0371145 | A1* | 12/2016 | Akutsu | G06F 11/1076 |
| 2017/0017415 | A1* | 1/2017 | Walker | G06F 3/0652 |
| 2017/0131948 | A1* | 5/2017 | Hoang | G06F 3/0653 |
| 2017/0177225 | A1* | 6/2017 | Mehta | G06F 3/0649 |
| 2017/0278581 | A1* | 9/2017 | Takizawa | G11C 16/3495 |
| 2018/0300084 | A1* | 10/2018 | Kachare | G06F 3/0653 |

OTHER PUBLICATIONS

An Algorithm for Error Correcting Cyclic Redundancy Checks by McDaniel (Year: 2003).*

Improving Performance And Reliability Of Flash Memory Based Solid State Storage Systems by Wang; U of Cincinnati; Doctoral Dissertation (Year: 2015).*

\* cited by examiner

TRACKING PERSISTENT MEMORY USAGE

BACKGROUND

High speed, high density, and high endurance memory devices are desired in a modern computer system in order to improve the overall performance of the computer system. Dynamic random-access memory (DRAM) has low latency, short, access time, and high endurance. However, the size of DRAM in a computer system is generally limited due to, for example, relatively high cost and difficulty in making large DRAM chips or modules. An electrically accessible non-volatile or persistent memory, often referred to as storage-class memory (SCM), that combines benefits similar to those of DRAM, such as high performance and robustness, with the persistent capabilities and low cost of conventional solid-state storage has been developed and is beginning to be used in modern computer systems.

BRIEF DESCRIPTION OF THE DRAWINGS

Various embodiments in accordance with the present disclosure will be described with reference to the drawings, in which:

FIG. 9A illustrates an example statistics update entry to be written to a statistics log, according to certain embodiments;

FIG. 9B illustrates an example statistics update entry from a circuit external to an SCM memory controller, according to certain embodiments;

FIG. 9C illustrates an example statistics log entry to be written to a statistics log in an SCM, according to certain embodiments;

FIG. 9D illustrates an example statistics update entry read from a statistics log in an SCM, according to certain embodiments;

DETAILED DESCRIPTION

Figure 1:
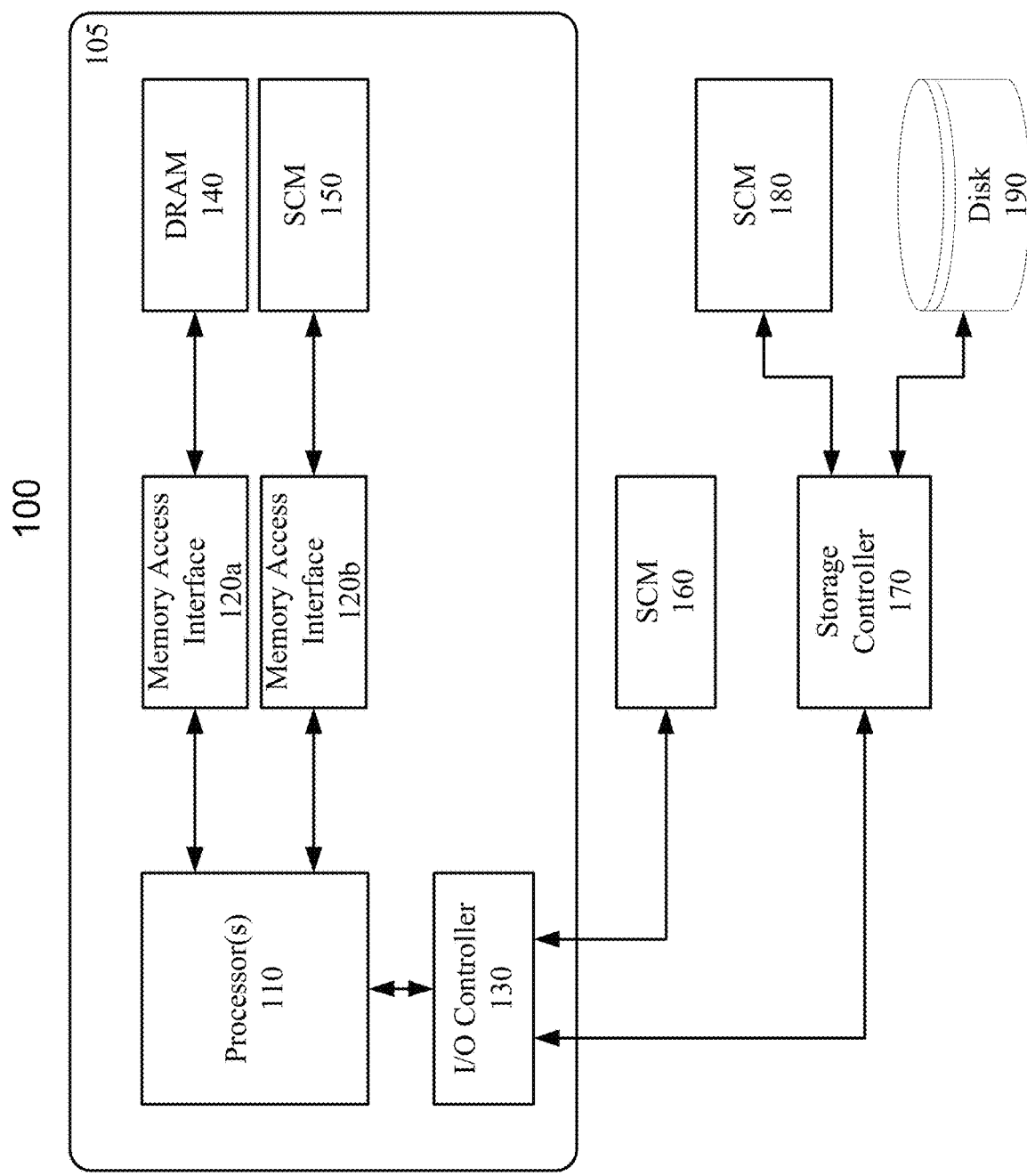
FIG. 1 is a simplified block diagram of an example computer system using storage-class memory (SCM), according to certain embodiments.

Embodiments of the present disclosure provide methods, systems, computer-readable media, and operations for tracking the usage of persistent memory in a computer system, such as a server. In one embodiment, multiple write and/or read operations performed on blocks of a storage-class memory module (SCM) may be logged when the operations occur, and may be persisted into a statistics log in the SCM as a single statistics log entry by an SCM memory controller. At a later time when a management controller of the computer system is available and/or when more bandwidth of the SCM and the SCM interface becomes available, the history of the operations saved in the statistics log may be read back by the management controller. The management controller may read the statistics for the memory blocks associated with the logged operations from, for example, a statistics table in the SCM, determine updated statistics for the memory blocks based on the existing statistics and the number of new operations performed on the memory blocks indicated by the statistics log, and write the updated statistics to the statistics table in the SCM. In this way, the statistics log and the statistics table are not updated after each read/write operation, and thus the number of write operations to the SCM can be reduced. The statistics table may be used for wear-leveling or balancing. By persisting the statistics log for SCM operations when the SCM operations occur and processing the statistics log at a later time when more resources are available, the actual updating of the statistics in the statistics table can be decoupled from the SCM operations causing the statistics to be updated. In addition, because the statistics log is persisted in the SCM, the statistics log can be processed at a later time even after the SCM is powered down. In some implementations, cyclic redundancy check (CRC) bits may be included in the statistics log for write/read error detection and/or correction. In some implementations, the SCM memory blocks used for storing the statistics log can be determined based on the usage statistics in the statistics table.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

One challenge in computer systems is the need for memory technologies that can improve overall performance and reduce cost. Dynamic random-access memory (DRAM) is known for high performance and low capacity, and for being relatively expensive. Thus, a computer system may only have enough DRAM memory space to store a fraction of the total data set that the processor(s) of the computer system may need to operate on. In addition, DRAM memory is volatile, and thus, if the computer system crashes or loses power, data stored in the DRAM memory will be lost. Therefore, most data is kept on storage devices, such as solid-state drives (or disks) (SSDs) or hard disk drives (HDD), which may have a higher capacity and lower cost, but a much lower performance than DRAM. Storage-class memory (SCM) is a new hybrid storage/memory tier with particular characteristics. Physically, it may be connected to memory slots in a motherboard like DRAM (e.g., in the form of dual in-line memory modules (DIMMs)), and may be managed and accessed like DRAM. SCM can have a much lower cost than DRAM (e.g., about ⅕ to ⅓ of the cost of a DRAM with the same capacity) and much higher capacity than DRAM (e.g., 2 TB SCM DIMMs versus 64 GB DRAM DIMMs). SCM may have a read latency of, for example, about 300 ns to about 500 ns, which may be longer than the read latency of DRAM (e.g., about 50-100 ns), but is much shorter than the read latency of a NAND Flash memory (e.g., about 100 μs). While current SCM may be slightly slower than DRAM, it has a higher capacity and lower cost, and is persistent like traditional storage devices so that its content is preserved during power cycles. Therefore, SCM technology may enable a computer system to have a large, high performance, low cost, and persistent memory subsystem.

Although SCM devices provide substantial performance improvement (e.g., access speed) compared with conventional hard drives, SCM may have a limited lifetime dictated by the number of write operations that can be performed on the SCM. On the other hand, a computer system, such as a server, may receive thousands or millions of read and write requests from users, and thus may require a memory subsystem having a high endurance in order to meet the needs of some write-intensive applications. For a server using SCM, it is desirable to minimize the write operations to each page or subpage of the memory while meeting the needs of users.

In some implementations, the usage statistics of the SCM, such as the total SCM read and write operations performed on each SCM block may be tracked and used to write future data into the least used memory blocks for wear leveling or balancing. The usage statistics may be saved in the SCM such that the usage statistics may be maintained for the life time of the SCM. However, updating the usage statistics in the SCM for the large number of SCM blocks in read-time while the SCM, the SCM interface, and other resources (e.g., memory controller or management controller) are being used for other read/write operations may utilize a large portion of the available resources and bandwidth of the SCM system, and thus may affect the performance of the SCM system.

Techniques disclosed herein save the log of the SCM operations in a persistent statistics log (e.g., a FIFO) after a certain number of SCM operations. The persistent statistics log can be used at a later time when more resources are available, even after a power cycle, and thus can help to improve the performance of the SCM or minimize the impact on the performance of the SCM by the operation for tracking the usage of the SCM. In addition, because the statistics log and the usage statistics are not updated after each read/write operation, the number of write operations to the SCM can be reduced.

A computer system, such as a computer server or a network-based computing system, uses memory devices to store information that it will need immediate access to. It uses storage devices, on the other hand, to store information that it may act on, but does not need at a specific moment in time. Memory devices, typically static random access (SRAM) or DRAM, may have high performance, low capacity, and high cost, and may be volatile. Storage devices, typically hard disk drives (HDDs) or solid-state drives (SSDs), may have high capacity, affordability, and much lower performance than DRAM, and may be non-volatile. In some computer systems, applications may store data temporarily in DRAM. At specific execution points, data may be reformatted and placed into 512-byte or 4096-byte blocks (sometimes referred to as storage sectors), and then written (along with metadata) to disks structured as either file systems or databases for persistence. Ideally, it is desired that the memory subsystem of a computer system is sufficiently large to store all the data that will be needed, is sufficiently fast for almost immediate data access, is non-volatile such that data may not be lost when power is lost, and has a low-cost for it to be economically practical.

Storage-class memory, such as Resistive RAM, Phase Change Memory, Magneto RAM, and Ferro RAM, is a type of memory that has capacity and cost that are similar to storage devices (e.g., HDD), but with performance that is similar to memory devices (e.g., DRAM). SCM combines the benefits of DRAM memory, such as high performance and robustness, with the persistent capabilities and low cost of conventional solid-state or hard-disk magnetic storage. Because SCM is non-volatile, the content stored on it remains in the memory, not only in the case of planned power down or reboots, but also during unplanned crashes and downtime. SCM may be addressed at either a byte or a block level. Because SCM is byte-addressable, data may not need to be packaged into coherent 512-byte blocks. By keeping the most up-to-date content with byte-level granularity, while eliminating the intermediate copy, SCM may simplify the computer architecture and operating system, greatly improve the performance of the computer system, and give operating systems, software, and/or hypervisor developers significant flexibility. For example, an operating system may treat the SCM as block storage devices formatted by file systems and databases for compatibility purposes. Hypervisors may map isolated SCM regions directly to different virtual machines (VMs) as either execution memory or a flash-like storage resource, and maintain a memory mapping file or table. It is noted that even though some embodiments in the present disclosure may be described with respect to non-virtualized environments, techniques disclosed herein may be used in both virtualized environments and non-virtualized environments.

SCMs may have limited write lifetime (e.g., a limited number of write cycles, such as, for example, 1 million or 10 million or less) before wearing out or becoming unusable. The number of write cycles that can be performed on an SCM before the SCM becomes unusable or unreliable may be referred to as "write endurance." SCM write endurance may also be described in terms of full Device Writes Per Day (DWPD) for a certain warranty period (typically 3 or 5 years). In other words, if a 100-gigabyte (GB) SCM device is specified for 1 DWPD, it can withstand 100 GB of data written to it every day for the warranty period. Thus, if a 100-GB SCM device is specified for 10 DWPD, it can withstand 1 terabyte (TB) of data written to it every day for the warranty period. Another metric that may be used for device write endurance is Terabytes Written (TBW), which is used to describe how much data can be written to the device over the lifetime of the drive. The higher the TBW value, the better the endurance of the device. These specifications generally assume that data is written to the device substantially evenly or uniformly, or there is an underlying mechanism, hidden from the user, that will spread the write operations substantially evenly. Different types of SCM may have different write endurance characteristics.

FIG. 1 is a simplified block diagram of an example computer system 100 using storage-class memory, according to certain embodiments. Computer system 100 may include one or more processors 110, one or more memory access interfaces 120*a* and 120*b* (e.g., memory controllers), and an input/output (I/O) controller 130 coupled to processor(s) 110. In some implementations, these components may be on, for example, a motherboard 105, a card, or a system unit of computer system 100.

Memory access interfaces 120a and 120b may include memory hubs used to manage and control the access to the memory subsystem (e.g., the main memory) on computer system 100. The memory subsystem may include, for example, DRAM 140 and/or SCM 150. In general, DRAM 140 and SCM 150 may not be on the same chip as processor(s) 110 or memory access interfaces 120a and 120b. In some embodiments, the memory subsystem may include several levels of cache hierarchy (not shown), such as Level 1 (L1) caches, Level 2 (L2) caches, Level 3 (L3), or last level caches. DRAM 140 may include, for example, dynamic random-access memory (DRAM) or synchronous dynamic random-access memory (SDRAM), such as double data rate (DDR), DDR2, DDR3, or DDR4 SDRAM, of various sizes. SCM 150 may be a random access memory-type non-volatile SCM, such as certain types of resistive RAM memory, that has a read latency of, for example, less than about 1 microsecond (µs) (e.g., about 400 ns). Example of memory-type SCM may include conductive bridging RAM (CBRAM), phase-change memory (PCM), resistive random-access memory (RRAM or ReRAM), or spin-transfer torque (magnetic) random-access memory (STT-RAM or STT-MRAM), etc.

I/O controller 130 may be coupled to a storage controller 170. Storage controller 170 may implement, for example, a Peripheral Component Interconnect (PCI)-based protocol, UltraPath Interconnect (UPI), Advanced eXtensible Interface (AXI), Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. For example, storage controller 170 may control a disk 190, which may be, for example, a SCSI, SAS, or SATA-based hard-drive disk (HDD). Storage controller 170 may also control a storage-type SCM 180, such as a solid-state drive (SSD), using, for example, the NVMe protocol. Storage-type SCM 180 may include, for example, resistive memory.

In some embodiments, an SCM 160 may also be directly connected to I/O controller 130 without going through a storage controller. SCM 160 may include any of the memory-type SCM or storage-type SCM described above, and may have a read latency of, for example, less than 20 µs or less than 10 µs for a block of data.

Figure 2:
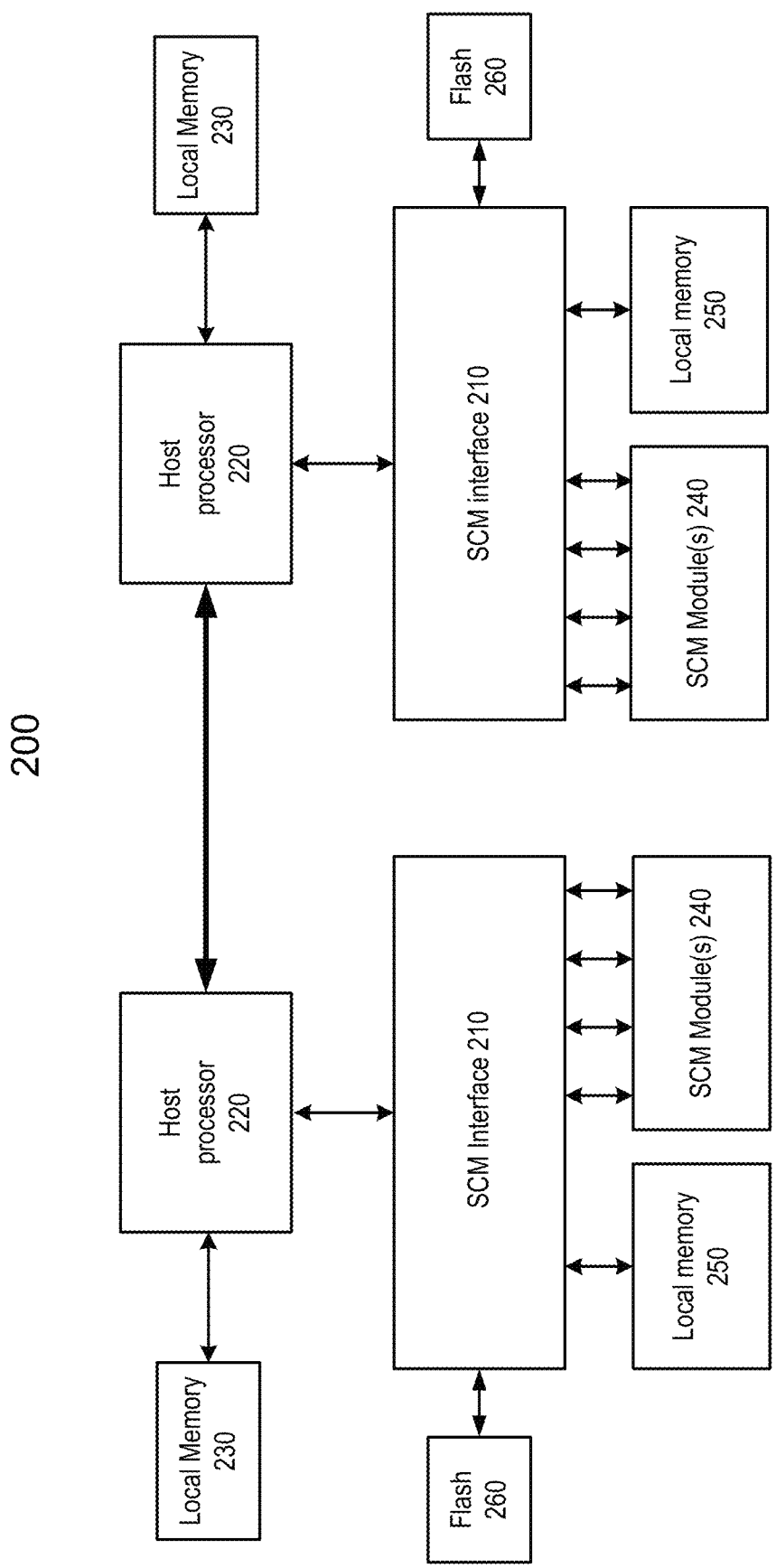
FIG. 2 is a simplified block diagram of an example computer server, according to certain embodiments.

FIG. 2 is a simplified block diagram of an example server 200, according to certain embodiments. Many components or modules of server 200 may be omitted in FIG. 2 in order not to obscure the features being described herein. One skilled in the relevant art will appreciate that the disclosed illustrative components are not meant to be an exhaustive identification of all the components required by or present in a server. Rather, illustrative components have been identified, in a non-limiting manner, to facilitate illustration of one or more aspects of the present disclosure. Still further, the illustrative components of server 200 may be logical in nature such that the physical implementation of one or more components can be varied or such that one or more of the logical components may be implemented in a virtualized manner. Additionally, one or more servers 200 may share one or more of the illustrated or unillustrated components, such as processors, graphical processing units, memory, storage, and the like.

In an illustrative embodiment, server 200 may be associated with various hardware components, software components, and respective configurations that facilitate the execution of client applications. In some implementations, server 200 may provide a multi-tenant platform to multiple clients. In some embodiments, server 200 may be dedicated to a client at a given time, while no other client may have access to server 200 at the same time.

Server 200 may include any number of host processors 220 as appropriate, each host processor 220 communicatively coupled to one or more channels of local memory (e.g., DRAM) and SCM modules. In the example shown in FIG. 2, server 200 may include two host processors 220 and associated memory devices. The two host processors 220 may be connected to each other using, for example, Ultra-Path Interconnect (UPI). Each host processor 220 may include application specific integrated circuits (ASICs), field programmable gate arrays (FPGAs), systems-on-chip (SoCs), network processing units (NPUs), processors configured to execute instructions, graphic processing units (GPUs), or any other circuitry configured to perform logical arithmetic and floating point operations. Examples of processors that may be included in host processor 220 may include processors developed by ARM®, MIPS®, AMD®, Intel®, Qualcomm®, NVIDIA®, and the like. In certain implementations, host processor 220 may include multiple processors or processing cores, wherein each processing core may be configured to execute instructions independent of other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores, or processing threads executing on the same core may share certain resources, such as, for example, buses, level 1 (L1) caches, and/or level 2 (L2) caches. The instructions executed by host processor 220 may be stored on a computer-readable storage medium, for example, in the form of a computer program.

Each host processor 220 may be coupled to a local memory 230, which may include at least some instructions that can be executed by host processor 220. In some implementations, local memory 230 may include firmware that may cause components of server 200 to initialize and identify system devices, such as the video display card, keyboard and mouse, hard disk drive, optical disc drive, and other hardware. In some embodiments, local memory 230 may include volatile memory devices including, for example, a random access memory (RAM), dynamic random access memory (DRAM), or a synchronous dynamic random-access memory (SDRAM), such as double data rate (DDR), DDR2, DDR3, or DDR4 SDRAM. In some embodiments, local memory 230 may also include several levels of cache hierarchy, such as Level 1 (L1) caches, Level 2 (L2) caches, Level 3 (L3) caches, or last level caches. Although FIG. 2 illustrates local memory 230 as a single device, it is understood that local memory 230 may include two or more memory devices, each of which can be, for example, a DDR DIMM, and can be connected to two or more DIMM sockets on a motherboard of server 200 (not shown in FIG. 2). The DIMM sockets can be electrically coupled with host processor 220 via a set of high speed buses.

Each host processor 220 may also be communicatively coupled to one or more SCM modules 240 and a local memory 250 through an SCM interface 210. SCM modules 240 can be used to provide storage for data and instructions to be used by host processor 220. For example, as discussed above, SCM modules 240 can act as an auxiliary DRAM device to provide backup for local memory 230, store instructions and/or a large amount of operation data, or provide bulk data storage as a hard drive. SCM modules 240 may include, for example, flash-based NAND devices, RRAM devices, CBRAM devices, PCM devices, STT-RAM devices, etc. SCM modules 240 may be in the form of DIMMs that can be connected to DIMM sockets on a motherboard, where the DIMM sockets may be electrically coupled with SCM interface 210 via a set of high speed buses.

SCM interface 210 may include an FPGA, an ASIC, an SoC, or other circuitries, and can provide an interface between host processor 220 (and local memory 230) and SCM modules 240. SCM interface 210 may include interface circuitries (e.g., receivers, transmitters, signal-conditioning circuits, associated controllers, etc.) for transmitting or receiving sequences of signals (e.g., representing physical addresses and data) between host processor 220 and SCM modules 240. SCM interface 210 may establish one or more communication channels between host processor 220 and SCM modules 240 via various high speed buses. For example, SCM interface 210 may be electrically coupled with host processor 220 via a set of high speed buses including, for example, Peripheral Component Interconnect Express (PCIe) buses, Intel® UltraPath Interconnect (UPI) buses, etc.

SCM interface 210 may manage accesses to SCM modules 240 through one or more SCM channels. Each SCM channel may be used to access one or more SCM modules 240. SCM interface 210 may map between a set of logical addresses used by host processor 220 and a set of physical addresses in SCM modules 240. The set of logical addresses can be virtual addresses that may be managed by, for example, operating systems operating on host processor 220 and may be translated into host physical addresses before being mapped in the set of physical addresses in SCM modules 240. The set of physical addresses can be associated with one or more regions of SCM modules 240. When SCM interface 210 receives a request accompanied by a logical address to access SCM modules 240, SCM interface 210 may allocate physical memory space in SCM modules 240 and translate the logical address into a physical address of the SCM modules 240 based on the mapping, and transmit signals carrying the physical address to SCM modules 240 to perform a write operation or a read operation in a region of SCM modules 240. In various embodiments, SCM interface 210 may also perform other control and management functions, such as direct memory access (DMA), data encryption and decryption, error correction coding (ECC), security control, and data logging.

SCM interface 210 may also be coupled to a local memory 250. Local memory 250 may include volatile memory devices (e.g., RAM) and non-volatile memory devices (e.g., ROM) to store various data to support the operations of SCM interface 210. For example, local memory 250 may store the mapping information between logical addresses and physical addresses, which can be retrieved by SCM interface 210 to perform address mapping for processing the access requests to SCM modules 240 from host processor 220, DMA engines, etc. As another example, local memory 250 may provide temporary storage for migration of data within SCM modules 240. Local memory 250 may also be used to temporarily store other management data structures for managing the SCM modules, such as block write/read counters and measured data for performance monitoring and/or wear leveling.

In some implementations where SCM interface 210 is implemented on an FPGA, a non-volatile memory, such as a flash memory 260, may be coupled to SCM interface 210 through, for example, a Serial Peripheral Interface (SPI) interface. Flash memory 260 may store FPGA image file (e.g., netlist information) and firmware for booting and configuring the FPGA to implement the aforementioned functionalities of SCM interface 210. In some implementations, the firmware may be embedded in the FPGA image file.

Figure 3:
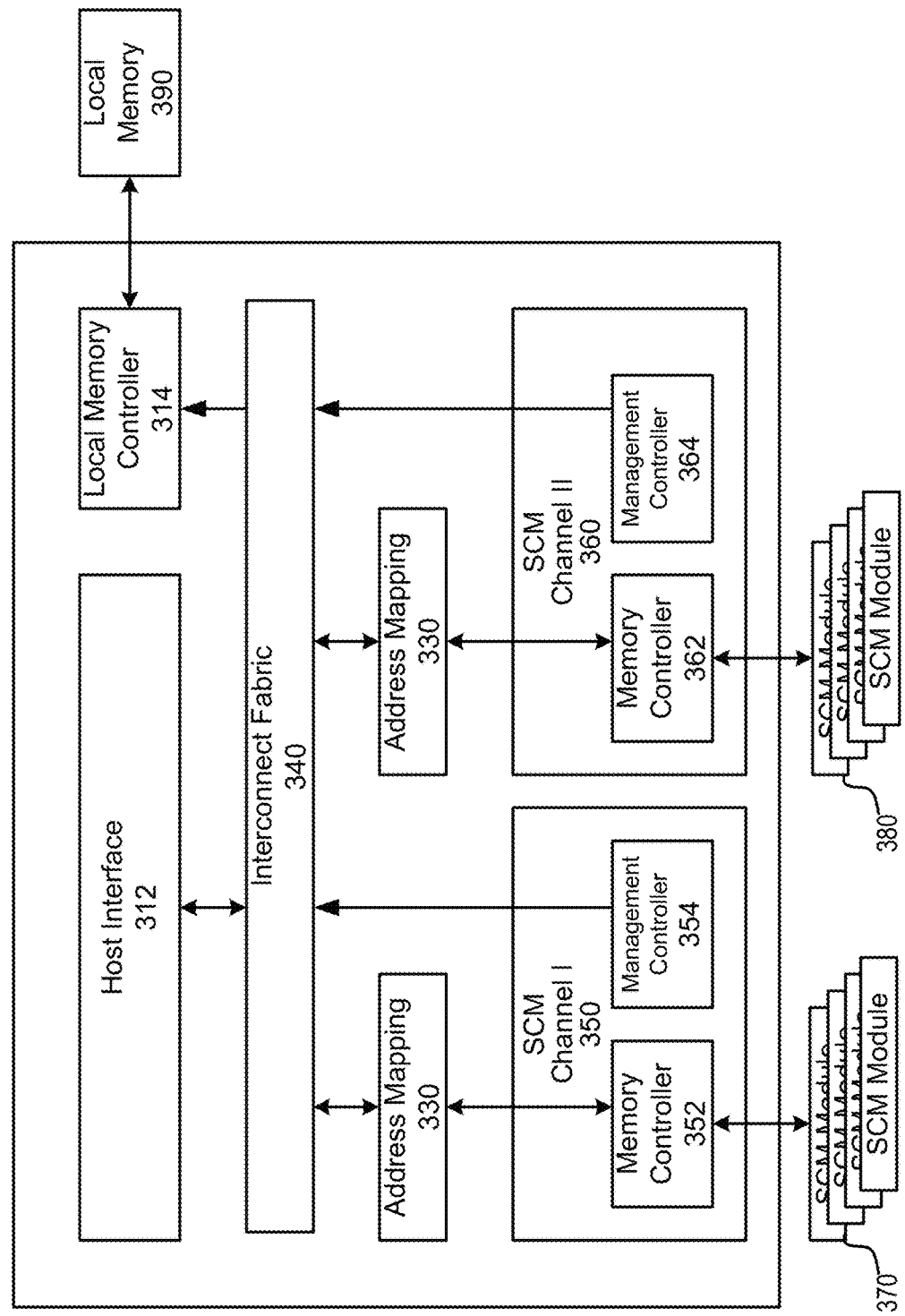
FIG. 3 is a simplified block diagram of an example SCM interface between a processor and SCM modules, according to certain embodiments.

FIG. 3 is a simplified block diagram illustrating an example SCM interface 300, such as SCM interface 210 of FIG. 2, between a host processor and SCM modules, according to certain embodiments. In the example shown in FIG. 3, SCM interface 300 may include a host interface 312, a local memory controller 314, an interconnect fabric 340, and one or more SCM channels, such as SCM channel I (350) and SCM channel II (360).

Host interface 312 may process requests to access the SCM modules from different sources. For example, host interface 312 may include interfaces for high speed buses (e.g., PCIe, UPI, etc.), and may receive access requests (e.g., read or write) from host processor 220 via these high speed buses. Host interface 312 can also process access requests from, for example, a memory management unit (MMU) of server 200 (not shown) as part of a direct memory access (DMA) scheme. The MMU may accept an access request including a logical address provided by, for example, a virtual machine instance or the hypervisor operating on host processor 220, and forward the access request together with the local address to SCM interface 300 through host interface 312. SCM interface 300 may then process the access request, and transmit the requested data (e.g., for a read operation), as well as a status of processing the access request, back to host processor 220 or the MMU.

Local memory controller 314 may be connected to a local memory 390, which may include, for example, a DRAM device. As described above with respect to local memory 250, local memory 390 may store the mapping information between logical addresses and physical addresses, which can be retrieved by SCM interface 300 to perform address mapping for processing the access requests to the SCM modules from host processor 220, DMA engines, etc. In some embodiments, local memory 390 may provide temporary storage for migration of data within the SCM modules. In some embodiments, local memory 390 may also be used to temporarily store other management data structures for managing the SCM modules, such as data measured for performance monitoring and/or wear leveling (e.g., block write/read counts).

Host interface 312 may communicate with interconnect fabric 340 through, for example, one or more AXI interfaces. Interconnect fabric 340 may be used to forward the requests and associated data (for example, data to be written to the SCM modules) from different bus interfaces and sources to different SCM channels, and forward data read back from different SCM channels to different bus interfaces and destinations.

In some implementations, SCM interface 300 may include one or more address mapping circuits 330. In some embodiments, address mapping circuit 330 may be used, for example, to scramble address bits for security and for performance reasons. For example, address mapping circuit 330 may perform scrambling of a logical address associated with an access request, and use the scrambled logical address for translation to physical addresses for accessing the SCM modules. In some embodiments, the scrambling can be based on random numbers generated by an internal random number generator. The randomized scrambling of logical addresses can improve security by, for example, making it more difficult for an intruder to trace an access pattern to the SCM modules, based on which the intruder might be able to deduce the memory locations that store important data for a particular application. Some address scrambling may be VM specific and some address scrambling may apply to all VMs in order to disguise access patterns. Some address scrambling may be performed to spread memory access across multiple SCM Channels for improved average bandwidth, latency, and wear leveling. In some implementations, address mapping circuit 330 may include an address translation circuit and a translation lookaside buffer (TLB) for address translation from machine physical addresses to SCM physical addresses. In some implementations, some of address mapping circuit 330 (e.g., circuit for address scrambling) may be between host interface 312 and interconnect fabric 340, and some of address mapping circuit 330 (e.g., circuit for address translation or TLB) may be between interconnect fabric 340 and an SCM channel.

Each SCM channel, such as SCM channel I (350) or SCM channel II (360), may include a memory controller (e.g., memory controller 352 or 362), a management controller (e.g., management controller 354 or 364), and a physical layer (PHY) (not shown in FIG. 3) for controlling the access to one or more SCM modules. Memory controller 352 or 362 may provide a hardware interface to SCM modules 370 or 380 for performing write and read operations to SCM modules 370 or 380. Memory controller 352 or 362 may also perform the write and read operations (or decline to perform the operations) to implement various management operations, such as SCM device signaling, forward error correction calculation and correction, encryption/decryption, transaction buffering and/or reordering, write failure handling, ECC generation and scrubbing, refresh, or any combination thereof. Management controller 354 or 364 may perform management functions, such as memory allocation/deallocation, address translation (machine physical address to SCM device address), dynamic and static wear leveling, failed write management, temperature management, and interfacing with hypervisor, alone or in conjunction with memory controller 352 or 362.

For example, SCM channel I (350) or II (360) may perform various operations to improve the integrity of data stored at the SCM modules. For example, the memory controller and/or the management controller of an SCM channel may maintain a statistics log including accumulative write counts for at least some of the physical addresses associated with the SCM modules, and may maintain a history of write operations performed to the SCM modules. The memory controller and/or the management controller of an SCM channel may also implement a pre-determined wear-leveling policy for the SCM modules based on the accumulative write count information in the statistics log. For example, the memory controller and/or the management controller of an SCM channel may update the mapping between the logical addresses and physical addresses to direct the write operations to regions of the SCM modules associated with lower accumulative write counts. With such arrangements, the write operations can be more evenly distributed among different regions of the SCM modules, which can extend the lifetime of the SCM modules.

Further, the memory controller and/or the management controller of an SCM channel can also perform other operations to reduce the likelihood of data error at the SCM modules. For example, the memory controller and/or the management controller may determine that a region of the SCM modules has a low reliability based on a set of metrics including, for example, the accumulative write counts, write failure rate, etc. The accumulative write counts may refer to a number of successful write operations (where the stored data matches the write data) performed on a particular region of the SCM modules. A write failure, on the other hand, may refer to a scenario where the stored data does not match the write data, and the data error is not correctable (e.g., based on error correction codes (ECC), or other schemes). Based on such a determination, the memory controller and/or the management controller may copy or move the data stored in that region to another region of the SCM modules associated with a relatively higher reliability (based on the same set of metrics) to reduce the likelihood of data error caused by the potentially defective SCM devices. In addition, the memory controller and/or the management controller can also perform various error correction schemes to further reduce the likelihood of data error. For example, the memory controller and/or the management controller can generate and store error correction codes (ECC) based on the stored data. In one example, the memory controller and/or the management controller may employ a Reed-Solomon (RS) algorithm to generate error correction symbols based on pre-determined chunks (e.g., 64 bytes) of stored data, and store the error correction symbols with the chunks of data. The memory controller and/or the management controller may also perform a data scrubber process, in which the system can perform periodical verification of the stored data and correct any data error based on the error correction symbols stored in the SCM modules.

The memory controller and/or the management controller can also perform various operations to improve the security of the SCM devices. For example, for each write operation, the memory controller may encrypt the data before storing the data to the SCM modules. In some embodiments, the encryption may be based on a combination of a first key provided by a virtual machine instance and a second key generated by an internal random number generator. The memory controller and/or the management controller can also maintain a mapping between the virtual machine instance and the second key in order to retrieve the second key to decrypt the stored data for future read operations.

Moreover, the memory controller and/or the management controller may also detect potential malicious attacks by detecting anomalous SCM access patterns by an application or a virtual machine instance. For example, the memory controller and/or the management controller may track the accumulative write counts by a virtual machine instance. If the number of accumulative write counts exceeds a pre-determined threshold, the memory controller and/or the management controller may determine that the write operations requested by that virtual machine instance are potentially part of a malicious attack to damage the SCM modules (e.g., by requesting a high volume of write operations to exceed the write endurance limit), or to overwhelm SCM interface 300 such that other accesses to the SCM modules may be denied or delayed. As part of a write policing operation, SCM interface 300 may take various preventive measures based on the detection of the potential malicious attacks. For example, SCM interface 300 may deny further write access requests from that virtual machine instance, transmit a notification to an administrator, etc.

Each of SCM modules 370 or 380 may include one or more packages, where each package may include one or more dies or chips. The dies may include various organizations of different numbers of different structural units, such as cores, groups, banks, arrays, cells, or blocks as defined by various manufacturers. SCM modules 370 or 380 may have a DIMM form factor that is compatible with DRAM DIMM sockets. Each SCM module may have a capacity of, for example, 512 GB, 1 TB, 2 TB, or more.

In some embodiments, in order to minimize the write operations to an SCM, such as SCM 150, 370, or 380 that may be persistent, memory controller 352 or 362, management controller 354 or 364, TLB in address mapping circuit 330, or other entities of SCM interface 300 may track the number of write and/or write operations performed on each SCM page (e.g., 4-KB block), by using a statistics table stored in the SCM. In the statistics table, each SCM page may be associated with a total count of write and/or read operations performed on the physical memory page. In this way, the cumulative number of write operations to the SCM page during the lifetime of the memory or the memory page may be tracked. Based on the statistics table, pages that are not currently being allocated to any virtual machine, operating system (OS), or user process and have the least accumulative numbers of write operations may be allocated to a VM, OS, or user process. In this way, the number of write operations performed on each page of the memory may be substantially the same, such that no page would have significantly more writes than other pages or degrade faster than other pages. Therefore, the overall endurance or lifetime of the memory subsystem can be improved.

In general, it is desirable that the statistics table be maintained in the SCM as well such that the usage statistics may be maintained for the life time of the SCM. However, updating the statistics tables in the SCM for the large number of SCM blocks in read-time while the SCM, the SCM interface, and other resources (e.g., memory controller or management controller) are being used for other read/write operations may utilize a large portion of the resources and bandwidth of the SCM system, and thus may affect the performance of the SCM system.

In certain embodiments, multiple write and/or read operations performed on blocks of an SCM may be logged when the operations occur, and may be persisted into a statistics log in the SCM as a single statistics log entry by an SCM memory controller. At a later time when a management controller of the SCM system is available and/or when more bandwidth of the SCM and the SCM interface is available, the history of the operations saved in the statistics log may be read back by the management controller. The management controller may also read the statistics for the memory blocks associated with the logged operations from, for example, a statistics table in the SCM, determine updated statistics for the memory blocks based on the existing statistics and the number of new operations performed on the memory blocks as recorded in the statistics log, and write the updated statistics back to the statistics table in the SCM. Because the statistics log and the statistics table are not updated after each read/write operation, the number of write operations to the SCM can be reduced. The statistics table may be used for wear-leveling or balancing. By persisting the statistics log for SCM operations when the operations occur and processing the statistics log at a later time when more resources are available, the actual updating of the statistics in the statics table can be decoupled from the SCM operations causing the statistics to be updated. In addition, because the statistics log is persisted in the SCM, the statistics log can be processed at a later time even after a power cycle. In some implementations, cyclic redundancy check (CRC) bits may be include in the statistics log for write/read error detection and/or correction. In some implementations, the SCM blocks used for storing the statistics log can be determined based on the usage statistics in the statistics table.

Figure 4:
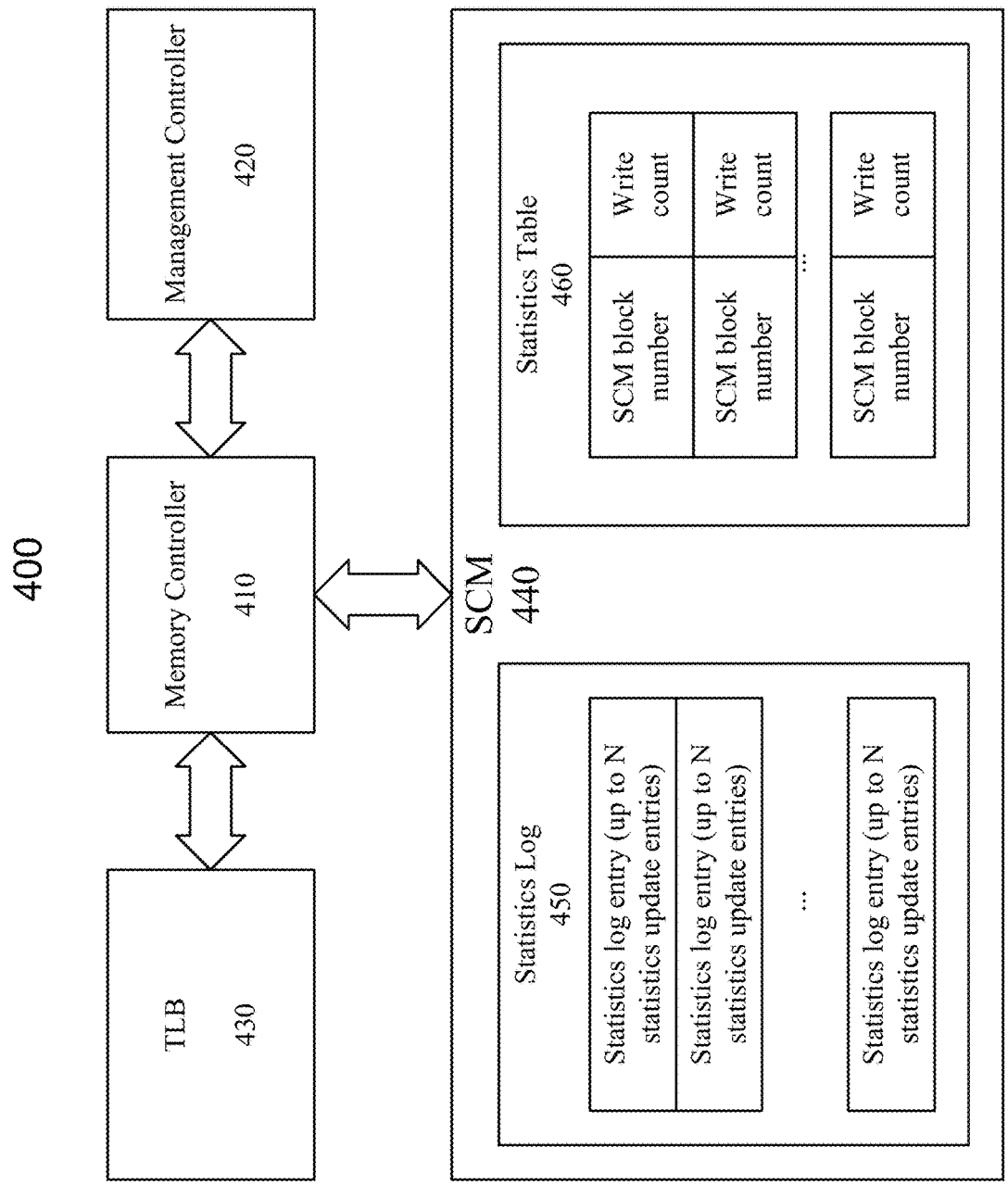
FIG. 4 is a simplified block diagram of an example system for tracking persistent memory usage, according to certain embodiments.

FIG. 4 is a simplified block diagram 400 of an example system for tracking persistent memory usage, according to certain embodiments. The operations of tracking memory usage and maintaining a statistics table for each memory page (e.g., 4-kB block) may be performed by a memory controller 410 (e.g., memory controller 352) and a management controller 420 (e.g., management controller 354), in combination with other circuits in an SCM interface (e.g., SCM interface 300), such as a TLB 430.

Memory controller 410 may track the write and/or read operations performed on blocks of a SCM 440, and save a log of the write and/or read operations into one or more statistics update entries. Each statistics update entry may include an identification of a memory block and the number of write/read operations (e.g., one) performed on the memory block. Memory controller 410 may also receive external statistics update entries from other circuits on the SCM interface, such as management controller 420 and TLB 430. For example, TLB 430 may store a write count associated with a memory block. The write count may track a number of write access requests associated with the memory block within a certain time period. The write count may be incremented whenever TLB 430 receives a request to write to the memory block. After the certain time period, TLB 430 may send the write count information associated with one or more memory blocks to memory controller 410 for updating the usage statistics for SCM 440.

In some implementations, each external statistics update entry may be written to a pair of external statistics update control and status resisters (CSRs). Memory controller 410 may include a number of external statistics update CSRs, such that each block on which an operation has been performed can have a CSR pair for writing the statistics update entry. In one example, each register pair may include a 32 bit lower bit register and a 32 bit upper bit register. The lower 32 bits of a 64-bit statistics update entry may be written into the lower bit register and the upper 32 bits of the 64-bit statistics update entry may be written into the upper bit register. The write to the upper bit register may cause a request to be sent to memory controller 410. In some implementations, management controller 420 and/or TLB 430 may write to or read from SCM 440 through memory controller 410 using, for example, AXI interfaces.

Memory controller 410 may wait for a certain number of statistics update entries and assemble the certain number of statistics update entries that are generated internal or received from other circuits into a statistics log entry. In one implementation, each statistics update entry may include 8 bytes, and each statistics log entry may include 8 statistics update entries (i.e., 64 bytes). After each statistics log entry is assembled, memory controller 410 may write the statistics log entry into a statistics log 450 in SCM 440. In some embodiments, statistics log 450 may be implemented as a FIFO, where a statistics log read pointer may be used and an entry may be removed from the FIFO after it has been read and/or processed in the order that it is written into the FIFO. In some implementations, a statistics log entry may be written to statistics log 450 even if the statistics log entry may be able to hold more statistics update entries. For example, a write to a flush CSR by management controller 420 may cause the statistics log entry to be written to statistics log 450. Statistics log 450 may store a number of statistics log entries each including multiple (e.g., up to N) statistics update entries.

As described above, SCM 440 may also include a statistics table 460 that may be used for wear-leveling or balancing. Statistics table 460 may store, for every SCM block, statistics such as an accumulative write count, an accumulative number of successful writes, an accumulative number of failed writes, an accumulative number of reads with correctable errors, or an accumulative number of reads with uncorrectable errors, etc.

Management controller 420 may read the entries in statistics log 450 at a later time, for example, when more bandwidth of SCM 440 is available or when management controller 420 has bandwidth. Management controller 420 may aggregate the number of new operations on a memory block indicated by the statistics update entries read back from statistics log 450, read the current counter value (e.g., write count) for the memory block from statistics table 460 in SCM 440, add the number of new operations to the counter value to determine a new counter value, and write the new counter value back to statistics table 460 in SCM 440 through memory controller 410. The statistics log read pointer for statistics log 450 may be updated after one or more statistics log entries have been read and/or processed. Management controller 420 may continue to process the entries in statistics log 450 when resources are available, until statistics log 450 is empty.

Statistics log 450 may not be stored in a fixed location in SCM 440. Rather, the memory block for storing entries of statistics log 450 may be changed based on, for example, a list of memory blocks to use dynamically provided by management controller 420. In some implementations, management controller 420 may provide the list of memory blocks for the statistics log based on the usage of the memory blocks in SCM 440. For example, management controller 420 may select the least used memory blocks that are not being used currently based on the information stored in statistics table 460. Management controller 420 may provide the list of memory blocks to memory controller 410 using the CSR interface described above.

Figure 5:
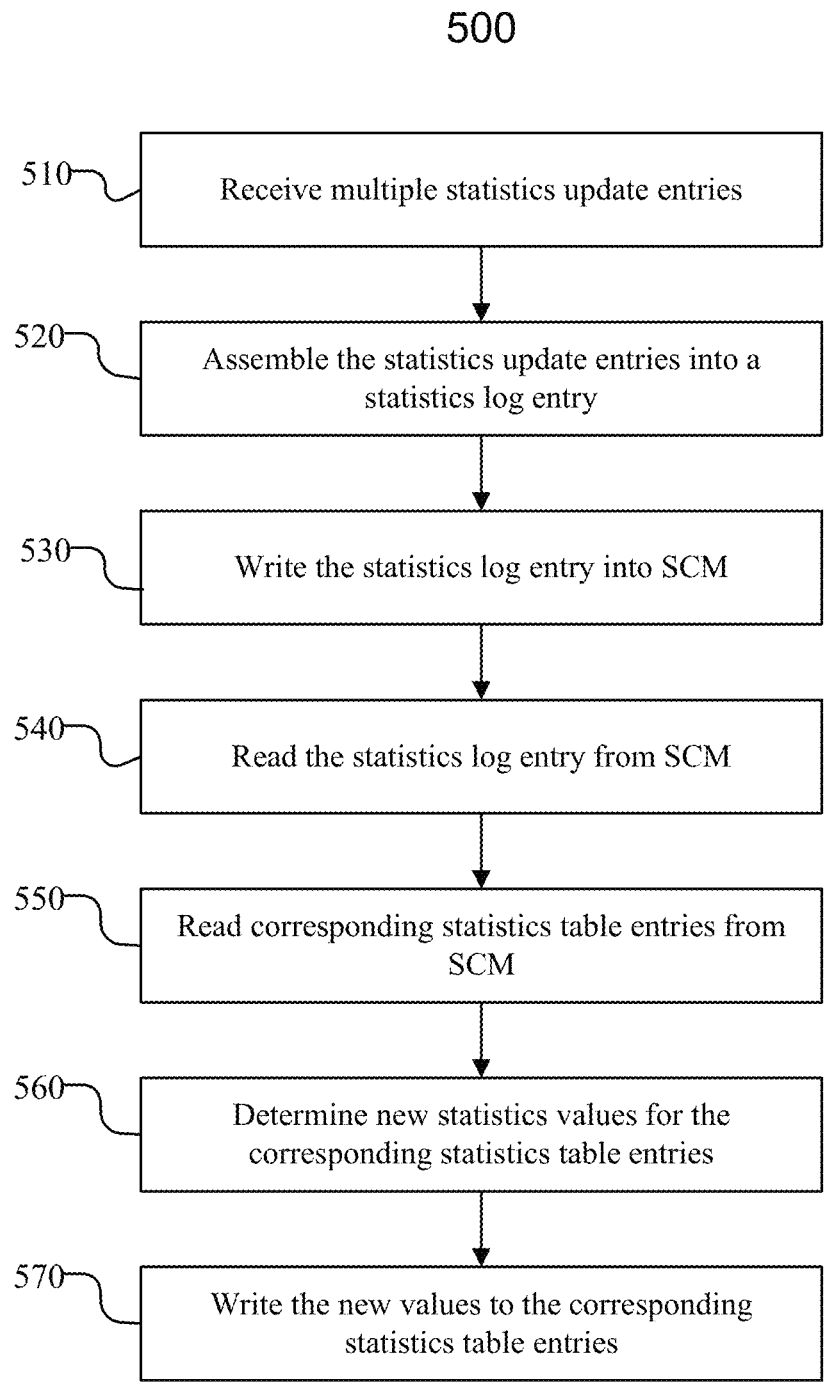
FIG. 5 is a simplified flow chart illustrating an example process to track persistent memory usage, according to certain embodiments.

FIG. 5 is a simplified flow chart illustrating an example process 500 to track persistent memory usage, according to certain embodiments. Process 500 may be performed by the example system described above with respect to FIG. 4. Process 500 may include a first portion in which the history of the operations (i.e., statistics log) performed on the memory blocks of an SCM is saved, and a second portion in which the statistics log is read and processed, and the statistics table including the accumulated statistics for each memory block is updated.

At block 510, a memory controller (e.g., memory controller 410) may receive statistics update entries from internal circuits and/or external circuits. For example, a circuit in the memory controller may track the write and/or read operations performed on each memory block, and generate a statistics update entry for each block on which the operations are performed. Each statistics update entry may include an identification (e.g., an address or block ID) of a memory block and the number of write/read operations performed on the memory block during a time period. As described above, the management controller (e.g., management controller 420), TLB (e.g., TLB 430), or other circuits in an SCM interface may also track the operations performed on the memory blocks and send statistics update entries to the memory controller through, for example, CSRs.

At block 520, the memory controller may assemble the received statistics update entries into one or more statistics log entries, where each statistics log entry may include multiple statistics update entries, such as up to 8 statistics update entries. In some implementations, the memory controller (e.g., a statistics engine in the memory controller) may generate CRC bits for each statistics update entry and include the CRC bits in the statistics log entry.

At block 530, the statistics engine in the memory controller may write each statistics log entry into the SCM after each statistics log entry is fully assembled to include a specified number of statistics update entries, or when a CSR is set to flush the received statistics update entries even if the statistics log entry does not have the specified number of statistics update entries. The statistics log entries may be written to a statistics log FIFO as described above. As also described above, the statistics log entries may be written to memory blocks that are identified by the management controller as the destinations for the statistics log entries.

At block 540, the management controller may read one or more statistics log entries from the statistics log FIFO through the memory controller. In implementations where the management controller provides the list of memory blocks for the statistics log entries, the management controller may know the address of the next statistics log entry to read from. After reading a statistics log entry, the management controller may extract the memory block identification and the corresponding number of write/read operations from the statistics update entries in the statistics log entry.

At block 550, the management controller may read statistics table entries corresponding to the memory blocks identified in the statistics log entry from a statistics table (e.g., statistics table 460) stored in the SCM. Each of the statistics table entries may correspond to one memory block and may include accumulated statistics of operations performed on the corresponding memory block, such as the accumulative count of write/read operations performed on the corresponding memory block during, for example, the life time of the SCM.

At block 560, the management controller may determine the new statistics (e.g., a new accumulative count) of write/read operations performed on each memory block identified in the statistics log entry. For example, the new accumulative count may be a sum of the current accumulative count in the statistics table and the number of new operations performed on the corresponding memory block determined based on the count of write/read operations saved in the statistics update entries.

At block 570, the management controller may update the corresponding statistics table entries in the statistics table based on the new accumulative count of write/read operations. As described above, the statistics table may be used for wear leveling.

In the following sections, some embodiments of the management controller and memory controller that may be used to perform the process described above are described. It is noted that these embodiments are just some examples of the management controller and memory controller that can be used to track operations on the memory blocks and update the accumulative count of write/read operations in the statistics table for wear leveling. A skilled person would understand that some other implementations can also be used.

Figure 6:
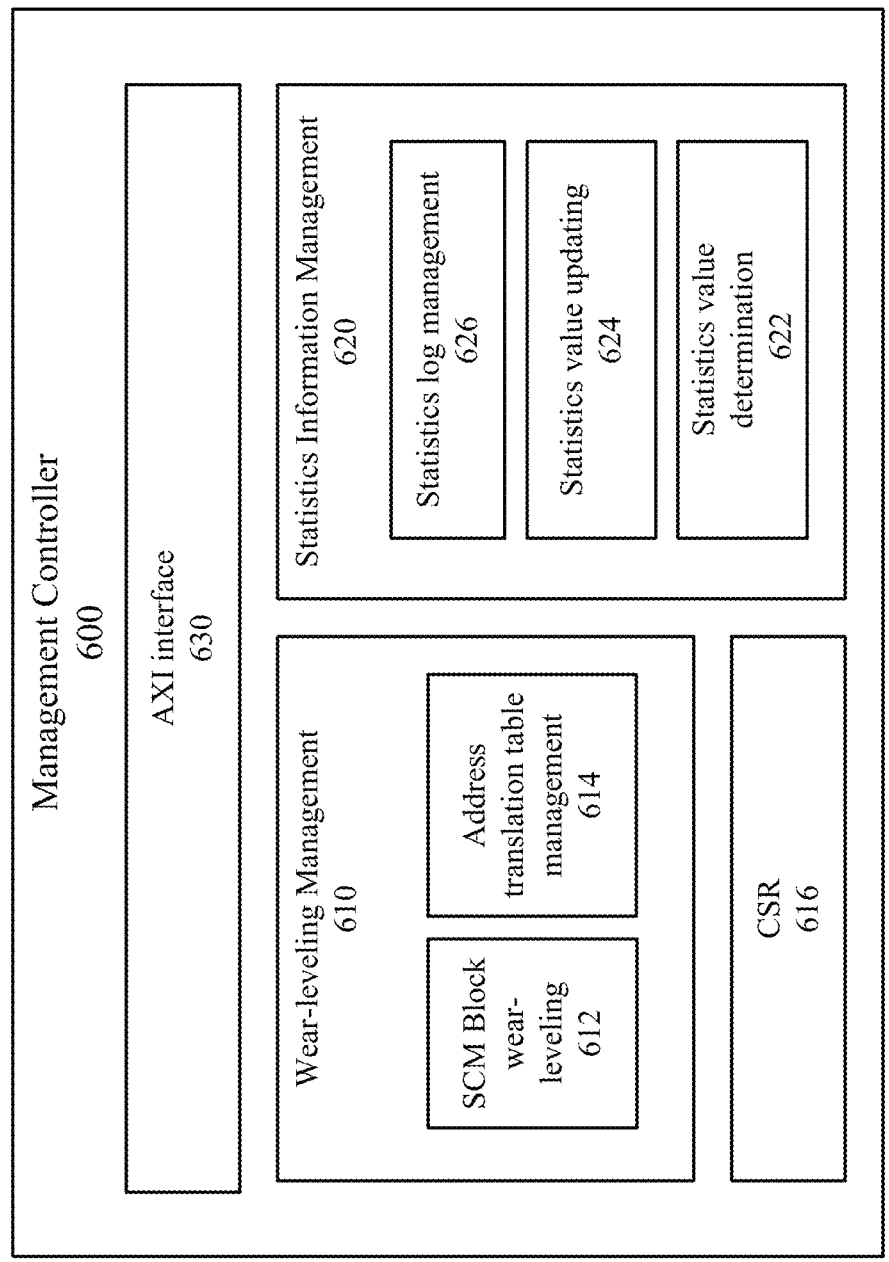
FIG. 6 is a simplified block diagram of an example SCM management controller, according to certain embodiments.

FIG. 6 is a simplified block diagram of an example SCM management controller 600, such as management controller 420, according to certain embodiments. SCM management controller 600 may include an AXI interface 630 for communicating with other circuits through an AXI fabric (e.g., interconnect fabric 340) as described above. SCM management controller 600 may also include one or more CSRs 616 for communicating with or controlling the operations of other circuits in the SCM interface. SCM management controller 600 may also include one or more processors (not shown in FIG. 6) for performing some of the functions described herein.

As shown in FIG. 6, SCM management controller 600 may include a wear-leveling management module 610 configured to perform one or more wear-leveling management operations as described above. For example, wear-leveling management module 610 may include an SCM block wear-leveling module 612 and an address translation table management module 614 to perform wear-leveling management operations. In one example, SCM block wear-leveling module 612 may obtain the accumulative count information including write failure and correctable data error information from a statistics table in an SCM, and determine a level of wear for at least some of the SCM blocks based on this information. SCM block wear-leveling module 612 may determine that certain SCM blocks are unreliable blocks based on, for example, history of write failure, the correctable data error and/or the accumulative count exceeding a threshold, etc. SCM block wear-leveling module 612 may also rank a set of SCM blocks based on the associated accumulative count. Address translation table management module 614 may determine a mapping between the logical addresses and the SCM blocks based on the information provided by SCM block wear-leveling module 612. For example, address translation table management module 614 may map logical addresses to the least worn SCM blocks. In some applications in a virtualized environment, wear-leveling management module 610 may also perform other functions, such as interfacing with the hypervisor to obtain logical addresses and VMID for address translation initialization, interfacing with an SCM memory controller to perform data migration, etc.

SCM management controller 600 may also include a statistics information management module 620 to manage the content of a statistics log, the storage of the statistics log, the content of the statistics table, and the storage of the statistics table in the SCM. For example, statistics information management module 620 may include a statistics value determination module 622, a statistics value updating module 624, and a statistics log management module 626. Statistics log management module 626 may provide the list of memory blocks for the statistics log entries. For example, in some implementations, as part of the wear-leveling policy, management module 626 may receive the level of wear of the SCM blocks from, for example, the statistics log or SCM block wear-leveling module 612, and determine which SCM block to store the statistics table data. Statistics log management module 626 may also maintain a statistics log read pointer used to read statistics log entries from the statistics log, and read statistics log entries from the statistics log. Statistics value determination module 622 may obtain the memory block addresses and the corresponding counts of new write/read operations associated with the memory block addresses from the statistics log entries that include multiple statistics update entries. Statistics value determination module 622 may also obtain the current accumulative count of write/read operations for the memory block addresses, and determine the new accumulative count of write/read operations for the memory blocks. In some implementations, statistics value determination module 622 may determine the number of successful write/read operations and the number of unsuccessful write/read operations. Statistics value updating module 624 may write the new accumulative count of write/read operations for the memory blocks to the statistics table. In some implementations, the statistics value updating module 624 may write the accumulative number of successful write/read operations and the accumulative number of unsuccessful write/read operations. In some implementations, statistics value updating module 624 may also manage the updating and storage of the statistics table in the SCM through the memory controller. In some implementations, statistics value updating module 624 may also force the flush of the statistics update entries by, for example, setting a CSR.

In some embodiments, wear-leveling management module 610 and/or statistics information management module 620 may be implemented in software code that may be executed by a processor or a microcontroller. In some embodiments, wear-leveling management module 610 and/or statistics information management module 620 may be implemented in both hardware circuits and software code.

Figure 7:
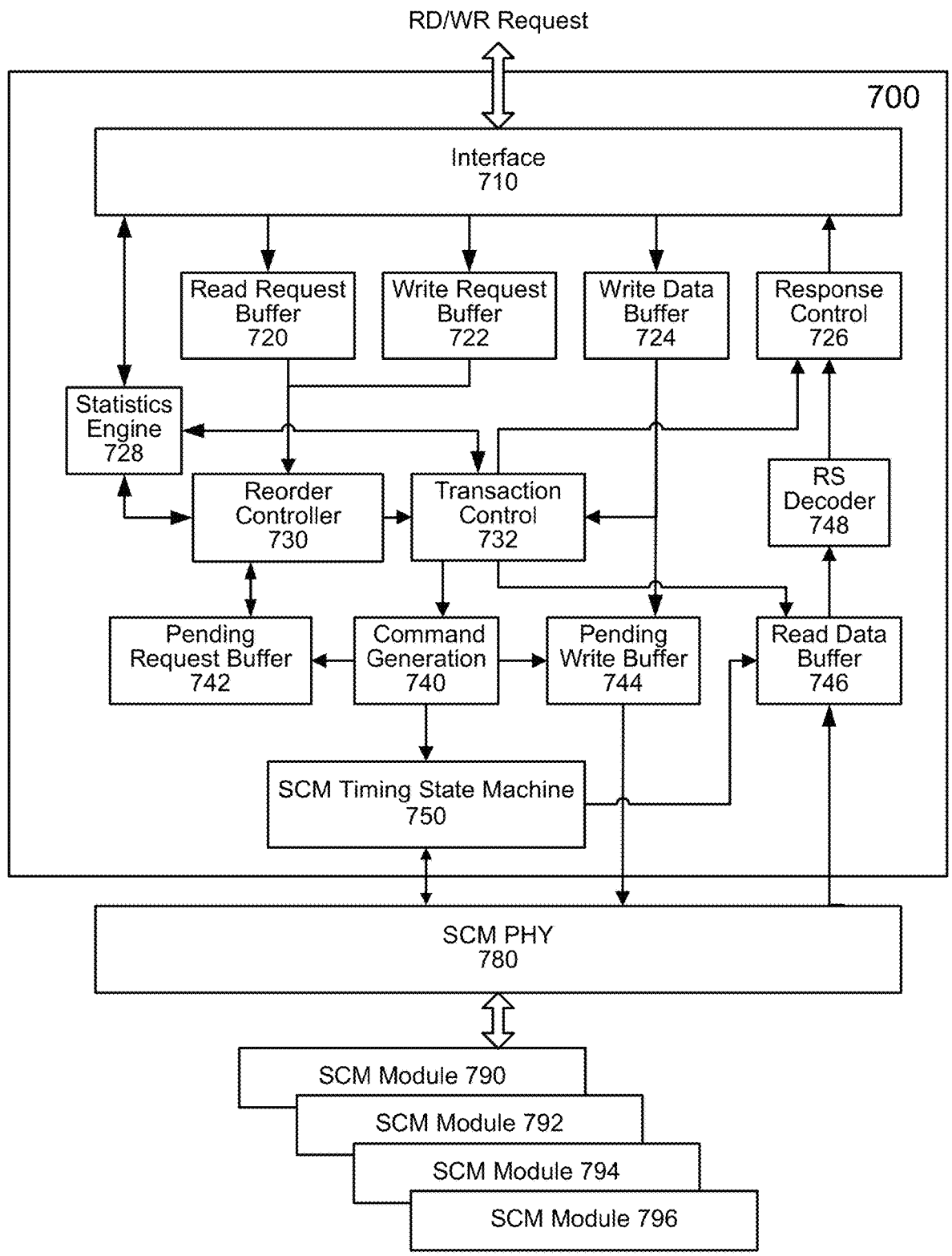
FIG. 7 is a simplified block diagram of an example SCM memory controller, according to certain embodiments.

FIG. 7 is a simplified block diagram of an example SCM memory controller 700, according to certain embodiments. Memory controller 700 may be an example implementation of memory controller 352, 362, or 410. In some embodiments, memory controller 700 may receive read and write requests, reorder the requests, generate commands to the SCM module(s) to service the requests, and control the timing of the signal interface to the SCM module(s). In some embodiments, memory controller 700 may also perform statistics log entry assembling and persisting. In some embodiments, memory controller 700 may also perform other functions, such as data encryption and/or decryption, ECC generation and correction, statistics generation, failed write management support, or memory block migration.

As shown in FIG. 7, memory controller 700 may include an interface 710 that interfaces between the interconnect fabric (e.g., interconnect fabric 340) and SCM modules 790, 792, 794, and 796. Interface 710 may receive read or write requests from the host processor or other circuits in the SCM interface through the interconnect fabric. In some embodiments, interface 710 may be based on, for example, an AXI protocol. The access request to the SCM module(s) may be in the form of an AXI read request or an AXI write request. The read or write request may also include the associated memory address. A write request may also be accompanied by the corresponding data. Interface 710 may grant to the request the access to a read request buffer 720, a write request buffer 722, and/or a write data buffer 724.

Read request buffer 720, write request buffer 722, and write data buffer 724 may each include a plurality of entries. Read request buffer 720 or write request buffer 722 may hold each read or write request as an entry in the buffer until the request is processed and dispatched by a transaction order control circuit, such as a reorder controller 730. Each entry in read request buffer 720 or write request buffer 722 may include a unique transaction identification. In some embodiments, read request buffer 720 and write request buffer 722 may be implemented as first in, first out buffers (FIFOs). Each entry in write data buffer 724 may include data associated with a write request. In some embodiments, write data buffer 724 may be implemented as a two-port RAM, such as a FIFO.

Reorder controller 730 may analyze all read and write requests from various blocks in the SCM interface and grant the requests in an order that may maximize the utilization rate of the SCM module(s). For example, reorder controller 730 may compare the addresses of incoming requests from the request buffers to the addresses of requests that have been sent to SCM module(s), but have not yet been completed to determine which incoming read/write request can be serviced next. Reorder controller 730 may send a transaction request to a transaction control circuit 732 to initiate the creation of an SCM command for the incoming read/write request that is determined to be serviced next. The transaction request may indicate whether the request is a read or write request, and may provide the indices needed to locate the read/write request in an entry in the request buffers. For example, for a read request, an index to read request buffer 720 may be provided to transaction control circuit 732. For a write request, the indices to write request buffer 722 and write data buffer 724 may be provided.

Transaction control circuit 732 may read the corresponding entries from the buffers and move transaction information (e.g., read or write, address, control, etc.) from the buffers to other circuits in memory controller 700. For example, transaction control circuit 732 may send the transaction information for the read/write request to a command generation circuit 740 for converting the request to an SCM command. In some embodiments, transaction control circuit 732 may send the transaction information to an address translation circuit (not shown in FIG. 7) for address translation during, for example, page migration, failed write management, or wear leveling.

Command generation circuit 740 may generate corresponding SCM command(s) for the request, and send the SCM command(s) to the SCM modules through an SCM timing state machine 750. The requests for which the corresponding SCM commands have been sent to the SCM module(s), but have not yet been completed may be stored in a pending request buffer 742. Command generation circuit 740 may also request the next data that is to be written to the SCM module(s) to be stored in a pending write buffer 744, which may hold the data to be written to the SCM module(s) until a completion status of the write is returned from the SCM module(s). In some implementations, forward error correction (FEC) techniques, such as Reed-Solomon (RS) encoding may be performed on the data before the data is stored in pending write buffer 744.

SCM timing state machine 750 may convert the commands received from command generation circuit 740 into the signaling needed by the SCM module(s), and ensure that timing specifications at the SCM memory interface are met. In some embodiments, SCM timing state machine 750 may operate at the same clock frequency as the SCM modules and may be asynchronous to the clock used by other circuits of memory controller 700. SCM timing state machine 750 may send the SCM commands with appropriate timing and level information to an SCM physical layer (PHY) 780, which may then drive the SCM bus(es) to SCM module 790, 792, 794, or 796 with command signals having appropriate data, timings, and levels. In some embodiments, SCM PHY 780 may include an SCM transmit PHY and an SCM receive PHY. In some implementations, SCM PHY 780 may be a part of memory controller 700.

Memory controller 700 may also include a read data buffer 746 and a response control circuit 726. Read data buffer 746 may be implemented as a two-port RAM, such as a FIFO. Read data buffer 746 may receive read data from the SCM modules through SCM PHY 780 (e.g., an SCM receive PHY). In some implementations, the read data may be decrypted and/or error-corrected before it is stored in read data buffer 746. For example, memory controller 700 may include a Reed-Solomon (RS) decoder 748 that receives the read data, determines if errors exist in the data, and corrects them if possible. The output of read data buffer 746 may be communicatively coupled to response control circuit 726. Response control circuit 726 may read the entry at the top of read data buffer 746 and return an acknowledgement to read data buffer 746, which may cause a read pointer of read data buffer 746 to increment.

In some embodiments, memory controller 700 may include a statistics engine 728. Statistics engine 728 may receive statistics update entry write requests from sources inside and outside memory controller 700. Statistics engine 728 may consolidate these statistics update entries into one or more statistics log entries, and generate write requests to reorder controller 730 so that the statistics log entries may be written to the SCM memory.

Figure 8:
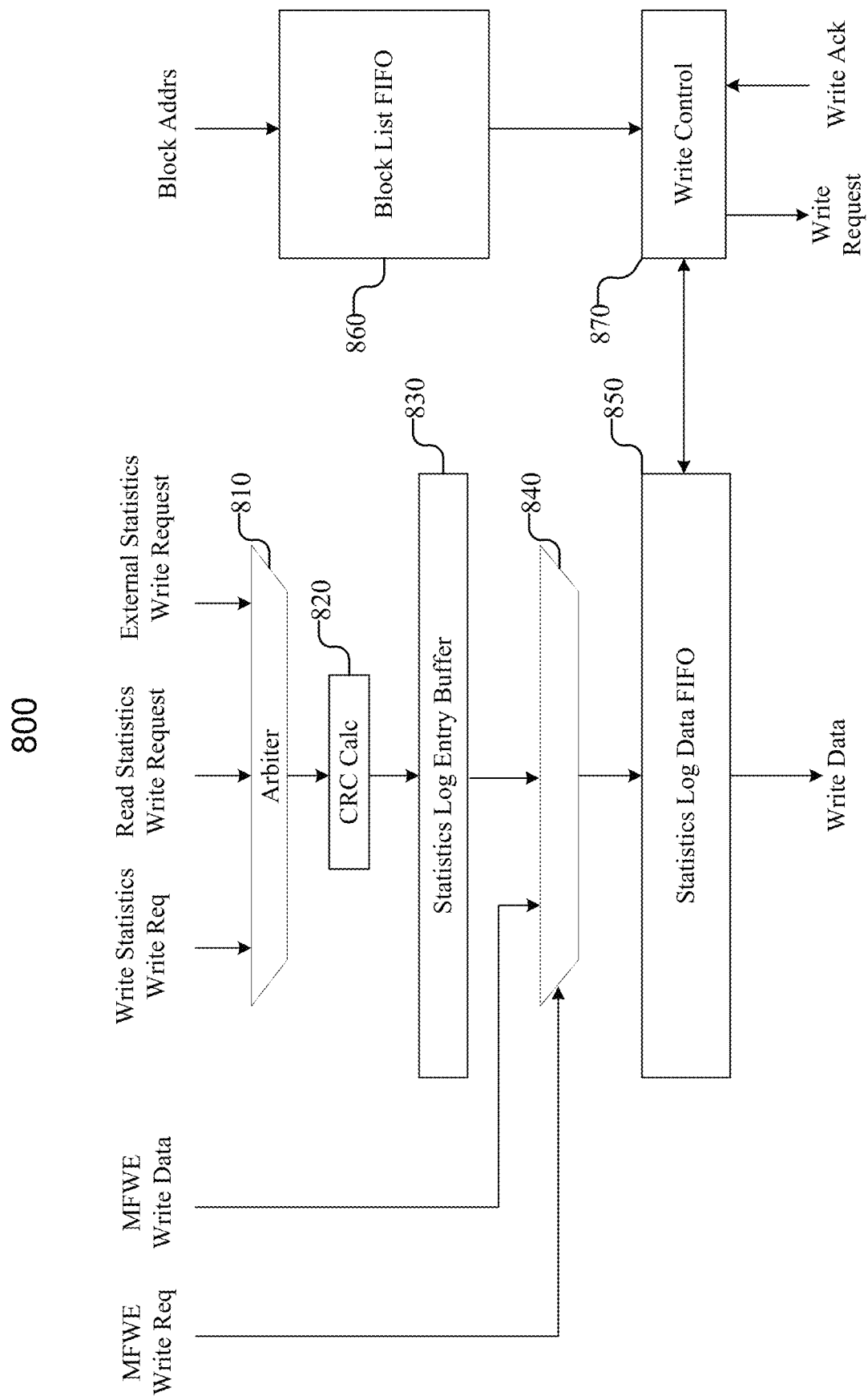
FIG. 8 is a simplified block diagram of an example statistics engine in an SCM memory controller, according to certain embodiments.

FIG. 8 is a simplified block diagram of an example statistics engine 800 in an SCM memory controller, such as statistics engine 728 in memory controller 700, according to certain embodiments. Statistics engine 800 may receive statistics update entry write requests from sources inside and outside the memory controller. For example, in some embodiments, statistics engine 800 may receive statistics update entries from sources inside the memory controller, such as RS decoder 748 (e.g., for read statistics update entries) and pending request buffer 742 (e.g., for write statistics update entries).

Figures 9A, 9B, 9C, 9D:
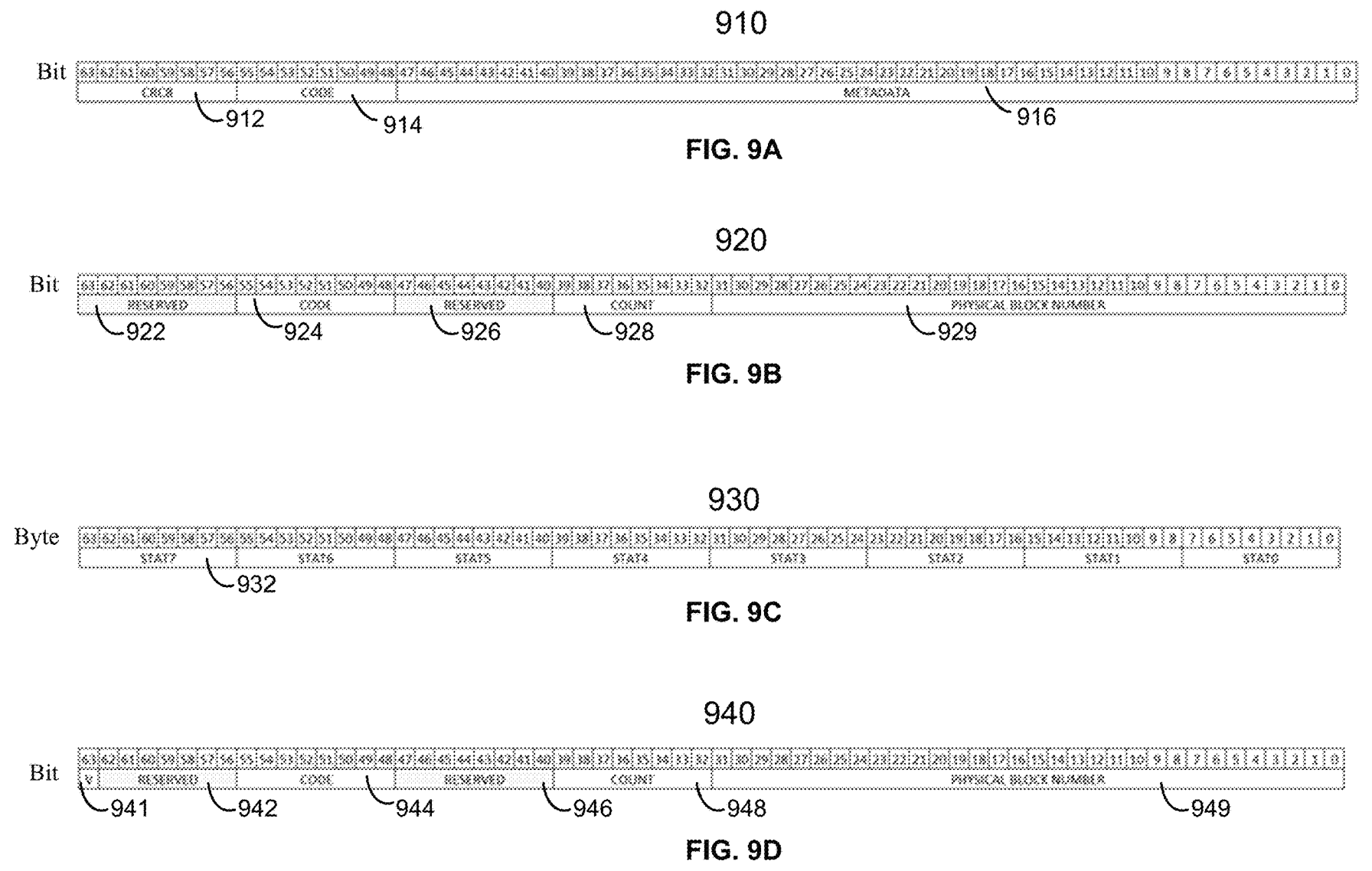

FIG. 9A illustrates an example statistics update entry 910 to be written to a statistics log entry, according to certain embodiments. The example statistic update entry 910 shown in FIG. 9A may include an 8-bit CRC field 912, an 8-bit code field 914, and a 48-bit metadata field 916. The content of metadata field 916 may depend on the value in code field 914. Statistic update entries with different values in code field 914 may include different metadata fields 916.

As shown in FIG. 8, statistics engine 800 may receive read statistics write requests, which may be generated when normal or scrubbing read transactions exit the RS decoder. In one example, code field 914 of the statistic update entry for a read statistics write request may include information, such as the read type, data correct, data uncorrectable, and symbols corrected. Metadata field 916 may include, for example, the physical block address and memory controller port number, both of which may be read from, for example, pending request buffer 742 when the read data exits RS decoder 748. Metadata field 916 may include a count subfield that may be set to one.

Statistics engine 800 may also receive write statistics write requests, which may be generated, for example, by pending request buffer 742 when a write completion status has been determined for a normal or scrubbing write transaction. Code field 914 in a statistic update entry for a write statistics write request may include information, such as the write type and write fail signals. Metadata field 916 may include, for example, the physical block address and memory controller port number, both of which may be read from, for example, pending request buffer 742. Metadata field 916 may include a count subfield that may be set to one.

In some embodiments, statistics engine 800 may also receive external statistics write requests from circuits outside of the memory controller. For example, other AXI masters in the SCM interface, such as the TLB and the management controller, can send statistics update entries to statistics engine 800 through CSRs. Statistics engine 800 may generate the CRC for each statistics update entry, pack the statistics update entries into a statistics log entry, and write the statistics log entry to the SCM. Since statistics engine 800 may generate the CRCs for the statistics update entries from circuits outside of the memory controller, the circuits outside of the memory controller (e.g., the AXI masters) may not need to generate the CRC field.

FIG. 9B illustrates an example statistics update entry 920 from a circuit outside an SCM memory controller, according to certain embodiments. The example statistic update entry 920 shown in FIG. 9B may include an 8-bit reserved field 922, an 8-bit code field 924, a second 8-bit reserved field 926, an 8-bit count field 928, and a 32-bit physical block number field 929.

In some implementations, these statistics update entries from circuits outside of the memory controller may each be written to a pair of external statistics update CSRs from a specified number of CSRs. For example, as described above, each register pair may include a 32-bit lower bit register and a 32-bit upper bit register. The lower 32 bits of a 64-bit statistics update entry may be written into the lower bit register and the upper 32 bits of the 64-bit statistics update entry may be written into the upper bit register. The write to the upper bit register may cause a request to be sent to an arbiter 810 in statistics engine 800.

Arbiter 810 may select the statistics update entries to be written to an available statistic log entry in a statistics log entry buffer 830. The arbiter may use a priority to select the statistics update entries. In one example, the priority may include, from the highest priority to the lowest priority, read statistics write requests, write statistics write requests, and external statistics write requests. Arbiter 810 may grant requests so long as space is available in statistics log entry buffer 830.

In some implementations, statistics engine 800 may include an optional CRC calculator 820. CRC calculator 820 may generate the CRC bits for an external statistics update entry and include the CRC bits in a statistics log entry so that the memory controller and the management controller may know whether a statistics update or log entry was successfully written and read back or whether the statistics update/log entry read back from the statistics log should be skipped because of write or read error(s). For example, an 8-bit CRC symbol may be calculated for a granted statistics update entry as shown in FIG. 9B, and the result may be placed in the upper byte of a statistics update entry in a statistics log entry. The CRC symbol may be used to determine if a statistics log entry read from the SCM includes a write/read error. If a CRC check on a statistics update entry fails, the memory controller may set a bit in the statistics log entry to indicate to the management controller that the statistics log entry read back from the SCM may include an error and should be ignored (e.g., skipped or discarded from further processing).

The statistics update entries selected by arbiter 810 and optionally processed by CRC calculator 820 may be sent to statistics log entry buffer 830, which may assemble the statistics update entries into one or more statistics log entries. Each statistics log entry may include multiple statistics update entries. In one example where each statistics log entry may be written to the SCM as a 64-byte cache line, statistics log entry buffer 830 may be a one entry, 64-byte wide buffer that may concatenate statistics update entries into a statistics log entry. In some embodiments, statistics log entry buffer 830 may include a statistics update entry pointer that points to the next free entry location in the buffer. When a statistics update entry is written to statistics log entry buffer 830, the entry data may be written to the free entry location indicated by the pointer. After the write occurs, the pointer may be incremented by one. Once all available entry locations in statistics log entry buffer 830 are occupied, the statistics log entry may be written to a statistics log data FIFO 850. After a statistics log entry is moved to statistics log data FIFO 850, all bits in statistics log entry buffer 830 may be reset to 0 and the statistics update entry pointer may be reset to 0 as well. In some implementations, software can cause statistics log entry buffer 830 to be emptied by writing a CSR, which may cause the content in statistics log entry buffer 830 to be written to statistics log data FIFO 850 even if not all available update entry locations are populated.

FIG. 9C illustrates an example statistics log entry 930 to be written to a statistics log in an SCM, according to certain embodiments. Statistics log entry 930 may include up to eight 8-byte statistics update entries 932. In some cases, statistics log entry 930 may include less than eight 8-byte statistics update entries 932 when, for example, the management controller triggers a statistics log entry buffer flush and a statistics log entry write by writing a CSR even if statistics log entry buffer 830 has not received 8 statistic update entries.

In some implementations, if a statistics log entry write to the SCM fails, the statistics log entry may be written again to a new location in the SCM. For example, in some embodiments, a migration and failed write engine (MFWE) may read the 64-byte write data from the pending write buffer (e.g., pending write buffer 744) and assert a write request to statistics log data FIFO 850 through another arbiter 840. The write data may be written to the end of statistics log data FIFO 850 so that the data can be written again to a different location in the SCM. Arbiter 840 may also receive normal statistics log entries from statistics log entry buffer 830. Arbiter 840 may select the next statistics log entry to be written to the SCM based on a specified priority, for example, with statistics log entries from statistics log entry buffer 830 having a higher priority than the write request from the MFWE.

In one example, statistics log data FIFO 850 may be a 64-byte wide FIFO with a specified number of entries. Statistics log data FIFO 850 can be written by, for example, statistics log entry buffer 830 and the MFWE. In some implementations, if statistics log data FIFO 850 becomes, for example, 75% full, a high priority flag may be asserted to cause the reordering logic to increase the priority of the statistics write request.

In some implementations, statistics engine 800 may also include a block list FIFO 860. Block list FIFO 860 may hold a list of memory blocks for the statistics engine to use for persisting the statistics log entries. In one example, the list of memory blocks may be fed to block list FIFO 860 in statistics engine 800 from the management controller via a CSR interface. This allows the management controller to choose SCM blocks to store the statistics log entries for wear leveling.

In one example, block list FIFO 860 may hold a list of SCM memory block addresses, which may be the destinations for future statistic log entries. The management controller may add new block addresses to the list by writing to the corresponding CSR(s). A write control logic 870 in statistics engine 800 may read new memory block addresses from block list FIFO 860 as needed. The depth of block list FIFO 860 may be set as desired.

Write control logic 870 may initiate statistics write requests to a reorder controller, such as reorder controller

730. Write control logic 870 may generate a statistics write request if statistics log data FIFO 850 has a valid entry and write control logic 870 has a valid block address from block list FIFO 860. In one implementation, the block address may be read from block list FIFO 860 and stored in a current address register in write control logic 870. Write control logic 870 may append 6'h0 to the block address to create a 64-byte aligned address, which may be the address of a 64-byte SCM region used to store the next statistics log entry. When a write request is granted, the value in the current address register may be incremented by one. If the new value in the current address register crosses the memory block or page (e.g., 4 kB) address boundary, the next block address may be read from block list FIFO 860 and stored in the current address register. If the new value in the current address register does not cross the memory block or page address boundary, the new value is used as the write address of the SCM region for storing the next statistics write request. If the new value crosses a memory page or block address boundary, but the block list FIFO 860 is empty, the statistics write request may not be sent until a new block address is available in block list FIFO 860.

In some implementations, statistics engine 800 may communicate the status of block list FIFO 860 to the management controller through, for example, interrupts. For example, if no valid entries remain in block list FIFO 860, a FIFO empty interrupt may be asserted. If the number of valid entries in block list FIFO 860 falls below a specified threshold, a threshold crossed interrupt may be asserted. The threshold value may be programmed through a CSR. In response to the interrupts, the management controller may send a new list of memory blocks to statistics engine 800 of the memory controller through, for example, CSRs.

In some embodiments, when the management controller reads the statistics log in the SCM, the memory controller may check the CRCs for each of the statistic update entries in a statistics log entry and set an error bit (e.g., bit 63) in each of the statistics update entries in the statistics log entry if any of the CRCs failed. The management controller may test the error bit in any of the statistics update entries in the statistics log entry to determine whether all of the statistics update entries in the statistics log entry should be processed or should not be processed (e.g., skipped or discarded from further statistics data processing).

FIG. 9D illustrates an example statistics update entry 940 read from a statistics log in an SCM, according to certain embodiments. Statistics update entry 940 read back from the statistics log may be similar to statistics update entry 920 in an external write statistics write request. The example statistic update entry 940 shown in FIG. 9D may include a 7-bit reserved field 942, an 8-bit code field 944, a second 8-bit reserved field 946, an 8-bit count field 948, and a 32-bit physical block number field 949. In addition, statistic update entry 940 may include an error bit (bit 63) that indicates whether the CRCs for all statistics update entries in the statistics log entry pass. For example, a "1" in the error bit (bit 63) of a statistics update entry may indicate that least one of the statistics update entries in the statistics log entry fails the CRC check, and the statistics log entry should not be used for updating the statistics table.

Figure 10:
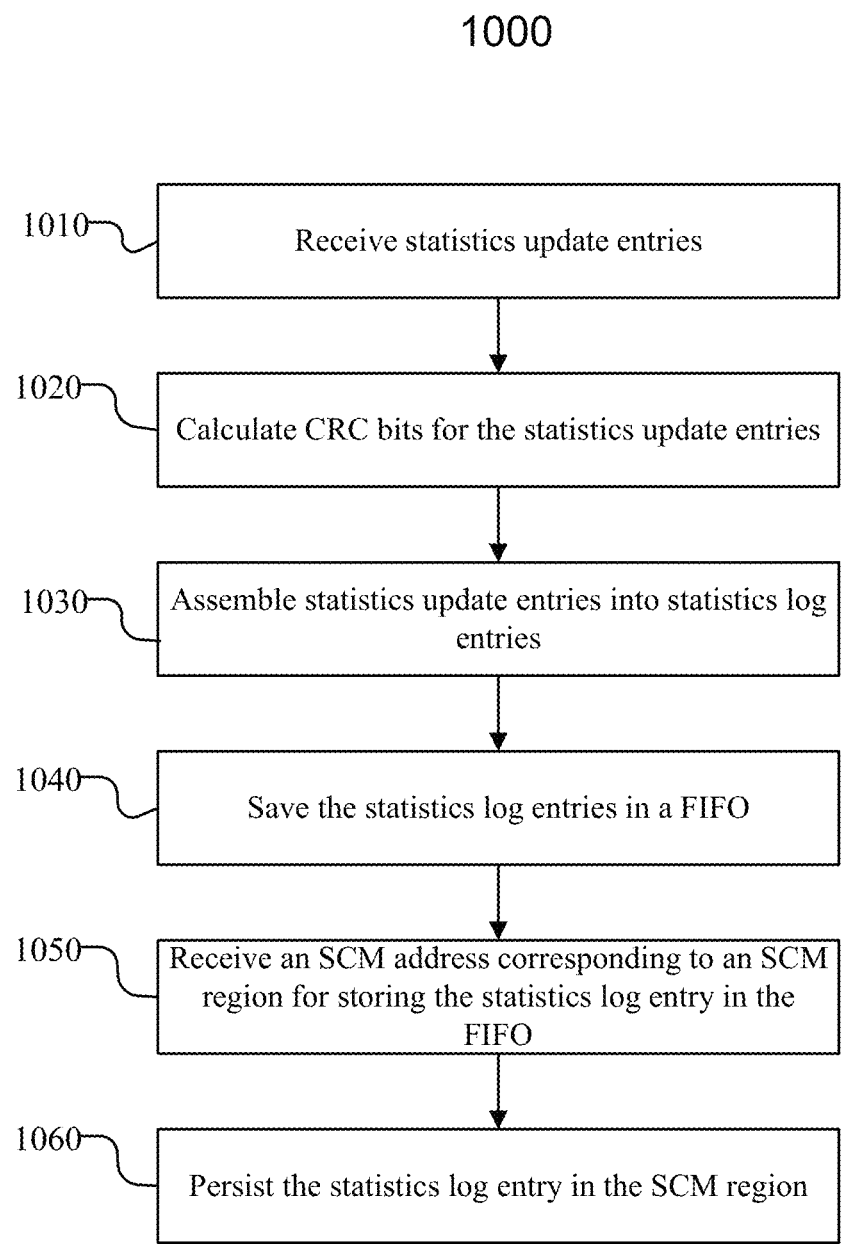
FIG. 10 is a flow chart illustrating an example process for tracking persistent memory usage, according to certain embodiments.

FIG. 10 is a flow chart illustrating an example process 1000 for tracking persistent memory usage, according to certain embodiments. Process 1000 may be performed by, for example, memory controller 410 or 700, and statistics engine 800 described above.

At block 1010, a memory controller, more specifically, a statistics engine in the memory controller, may receive statistic update entries from circuits inside and outside the memory controller. For example, a circuit in the memory controller (e.g., reorder controller 730, pending request buffer 742, and/or transaction control circuit 732) may track the write and/or read operations performed on the memory blocks, and generate a statistics update entry for each block on which the operations are performed. Each statistics update entry may include an identification (e.g., address or block ID) of the corresponding memory block and the number of write/read operations performed on the memory block during a time period. As described above, the management controller (e.g., management controller 420 or 600), TLB (e.g., TLB 430), or other circuits in an SCM interface may also track the operations performed on the memory blocks and send statistics update entries to the memory controller through, for example, CSRs. Examples of the statistics update entry are shown in FIGS. 9A and 9B described above. The statistics update entries may be sent to the statistics engine through write requests. In some implementations, the write requests may be processed by an arbiter (e.g., arbiter 810) based on a specified priority as described above with respect to FIG. 8 to accept the received statistics update entries.

Optionally, at block 1020, the statistics engine may calculate the CRC bits for the received statistics update entries. A CRC calculator in the statistics engine (e.g., CRC calculator 820) may generate the CRC bits for an external statistics update entry and include the CRC bits in the statistics log entry. For example, an 8-bit CRC symbol may be calculated for a granted statistics update entry shown in FIG. 9B, and the resultant CRC bits of the CRC symbol may be placed in the upper byte of an statistics update entry, such as one shown in FIG. 9A. The CRC bits may be used to determine if a write of a statistics update/log entry to the SCM fails. If a write failure is detected, the memory controller may rewrite the statistics log entry to a different address in the SCM. The statistics update entries processed by the CRC calculator may be sent to a buffer, such as statistics log entry buffer 830.

At block 1030, the statistics engine may assemble the statistic update entries in the buffer into one or more statistic log entries. As described above, each statistics log entry may include multiple statistics update entries. In one example, the buffer may include a statistics update entry pointer that points to the next free entry location in a statistics log entry to be assembled. When a statistics update entry is written to the buffer, the entry data may be written to the free entry location indicated by the pointer. After the write, the pointer may be incremented by one. Once all available entry locations in a statistics log entry are occupied, the statistics log entry may be fully assembled and ready to be written into the SCM. In some implementations, an assembled statistics log entry may not have all available statistics update entry locations populated due to, for example, a flush command sent through a CSR.

At block 1040, the statistics engine may save the assembled statistics log entries assembled at block 1030 into a statistics log data FIFO, such as statistics log data FIFO 850. In some implementations, once all available entry locations in a statistics log entry are occupied, the statistics log entry may be written to the statistics log data FIFO (e.g., statistics log data FIFO 850). After a statistics log entry is moved to the statistics log data FIFO, the assembling of a new statistics log entry may start. For example, all bits in statistics log entry buffer 830 may be reset to 0 and the statistics update entry pointer may be reset to 0 as well. In some implementations, software can cause statistics log entry buffer 830 to be emptied by writing a CSR, which may cause the content in statistics log entry buffer 830 to be included in a partially-filled statistics log entry and sent to statistics log data FIFO 850. In some implementations, the statistics log entry to be written into the SCM may be from other circuits, such as a migration and failed write engine (MFWE) that may send the statistics log entry that has been previously written to the SCM but the write has failed. The statistics log data FIFO may have a specified depth to hold up to a specified number of statistics log entries.

At block 1050, the statistics engine may receive an SCM address corresponding to a SCM region for storing the next statistic log entry. The SCM region may have a same size as the statistics log entry, such as 64 bytes. As such, an SCM block (e.g., a 4-KB SCM block) may include multiple (e.g., 64) SCM regions for storing multiple (e.g., 64) statistics log entries. For example, as described above, the statistics engine may include a block list FIFO (e.g., block list FIFO 860) that may hold a list of memory blocks for the statistics engine to use for persisting the statistics log entries. The list of memory blocks in the block list FIFO may be determined by a management controller to improve wear-leveling, and may be provided to the statistics engine using CSRs. In some embodiments, a block address may be read from the block list FIFO and stored in a current address register in a write control logic (e.g., write control logic 870). The write control logic may append 6'h0 to the block address to create a 64-byte aligned address, which may be the SCM address corresponding to the next SCM region used to store the next statistics log entry waiting in the statistics log data FIFO. When a write request to write the statistics log entry to the SCM is granted, the value in the current address register may be incremented by one. If the new value in the current address register crosses a memory block or page (e.g., 4 kB) address boundary, the next block address may be read from the block list FIFO and stored in the current address register, and thus the next statistics log entry may be stored in the next memory block. If the new value in the current address register does not cross the memory block or page address boundary, the new value may be used as the destination address corresponding to the next SCM region for storing the next statistics log entry, and thus the next statistics log entry may be stored in the same memory block. If the new value crosses a memory page or block address boundary and the block list FIFO is empty, the next statistics log entry may be held in the statistics log data FIFO until a new block address is received in the block list FIFO.

At block 1060, the statistic log entry may be written to the SCM region through a SCM write request as described above with respect to FIG. 7. Because the SCM address for each statistics log entry may be determined based on the list of memory blocks provided dynamically by the management controller, the statistics log may not have a fixed location and may not be in a contiguous region in the SCM. The statistics log may be implemented as a FIFO, so that the statistics log entries in the statistics log may be read out and processed by the management controller at a later time in the order that they are received. The management controller may determine the new accumulative count of operations performed on the memory blocks based on the write/read operations recorded in the statistics log entries, and update a statistical table that stores the accumulative count of operations performed on each memory block.

Figure 11:
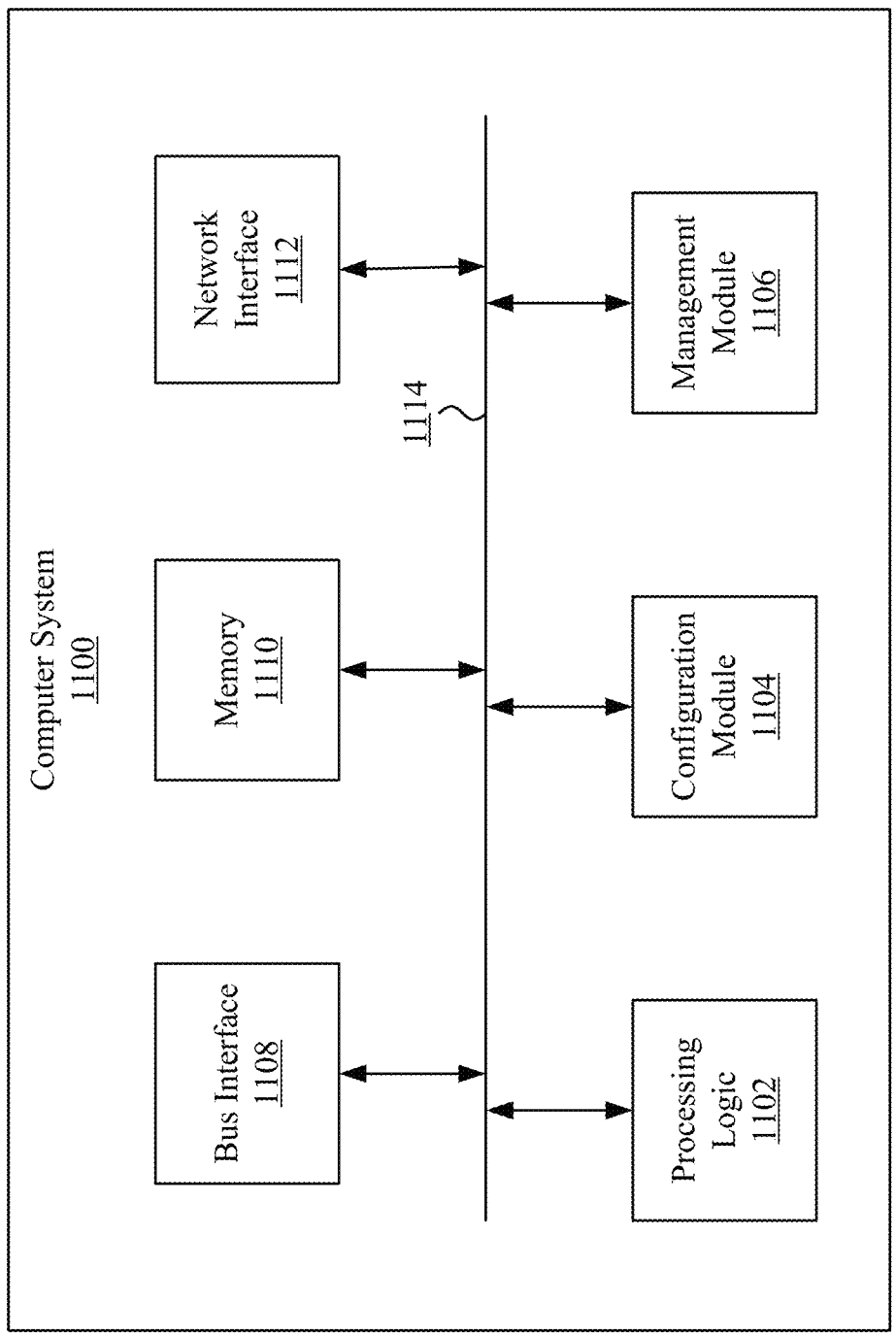
FIG. 11 illustrates aspects of an example computing system for implementing aspects in accordance with some embodiments.

FIG. 11 illustrates an example of a computer system 1100. Functionality and/or several components of the computer system 1100 may be used without limitation with other embodiments disclosed elsewhere in this disclosure, without limitations.

In one example, the computer system 1100 may include processing logic 1102, a configuration module 1104, a management module 1106, a bus interface module 1108, memory 1110, and a network interface module 1112. These modules may be hardware modules, software modules, or a combination of hardware and software. In certain instances, modules may be interchangeably used with components or engines, without deviating from the scope of the disclosure. The computer system 1100 may include additional modules, not illustrated here, such as components discussed with respect to the nodes disclosed in FIG. 12. In some implementations, the computer system 1100 may include fewer modules. In some implementations, one or more of the modules may be combined into one module. One or more of the modules may be in communication with each other over a communication channel 1114. The communication channel 1114 may include one or more busses, meshes, matrices, fabrics, a combination of these communication channels, or some other suitable communication channel.

The processing logic 1102 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1102 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 1102 may be stored on a computer-readable storage medium, for example, in the form of a computer program. The computer-readable storage medium may be non-transitory. In some cases, the computer-readable medium may be part of the memory 1110.

The memory 1110 may include either volatile or non-volatile, or both volatile and non-volatile types of memory. The memory 1110 may, for example, include random access memory (RAM), read only memory (ROM), Electrically Erasable Programmable Read-Only Memory (EEPROM), flash memory, and/or some other suitable storage media. In some cases, some or all of the memory 1110 may be internal to the computer system 1100, while in other cases some or all of the memory may be external to the computer system 1100. The memory 1110 may store an operating system comprising executable instructions that, when executed by the processing logic 1102, provides the execution environment for executing instructions providing networking functionality for the computer system 1100. The memory may also store and maintain several data structures and routing tables for facilitating the functionality of the computer system 1100.

In some implementations, the configuration module 1104 may include one or more configuration registers. Configuration registers may control the operations of the computer system 1100. In some implementations, one or more bits in the configuration register can represent certain capabilities of the computer system 1100. Configuration registers may be programmed by instructions executing in the processing logic 1102, and/or by an external entity, such as a host device, an operating system executing on a host device, and/or a remote device. The configuration module 1104 may further include hardware and/or software that control the operations of the computer system 1100.

In some implementations, the management module 1106 may be configured to manage different components of the computer system 1100. In some cases, the management module 1106 may configure one or more bits in one or more configuration registers at power up, to enable or disable certain capabilities of the computer system 1100. In certain implementations, the management module 1106 may use processing resources from the processing logic 1102. In other implementations, the management module 1106 may have processing logic similar to the processing logic 1102, but segmented away or implemented on a different power plane than the processing logic 1102.

The bus interface module 1108 may enable communication with external entities, such as a host device and/or other components in a computing system, over an external communication medium. The bus interface module 1108 may include a physical interface for connecting to a cable, socket, port, or other connection to the external communication medium. The bus interface module 1108 may further include hardware and/or software to manage incoming and outgoing transactions. The bus interface module 1108 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1108 may include the physical layer for any of these bus protocols, including a connector, power management, and error handling, among other things. In some implementations, the computer system 1100 may include multiple bus interface modules for communicating with multiple external entities. These multiple bus interface modules may implement the same local bus protocol, different local bus protocols, or a combination of the same and different bus protocols.

The network interface module 1112 may include hardware and/or software for communicating with a network. This network interface module 1112 may, for example, include physical connectors or physical ports for wired connection to a network, and/or antennas for wireless communication to a network. The network interface module 1112 may further include hardware and/or software configured to implement a network protocol stack. The network interface module 1112 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computer system 1100 may include multiple network interface modules, each configured to communicate with a different network. For example, in these implementations, the computer system 1100 may include a network interface module for communicating with a wired Ethernet network, a wireless 802.11 network, a cellular network, an Infiniband network, etc.

The various components and modules of the computer system 1100, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 12.

Figure 12:
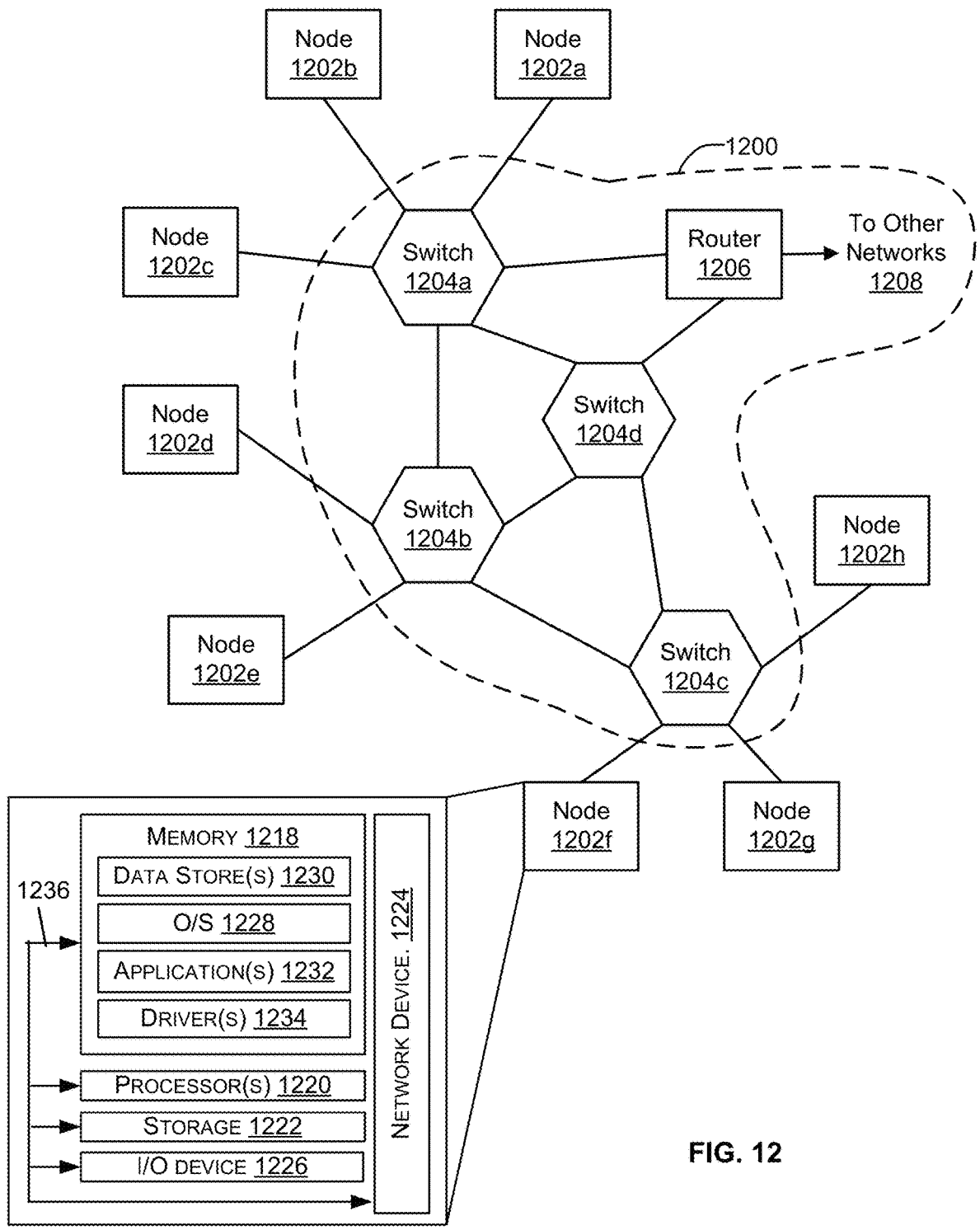
FIG. 12 illustrates an example architecture for features and systems described herein that includes one or more service provider computers and/or a user device connected via one or more networks, according to some embodiments.

FIG. 12 illustrates a network 1200, illustrating various different types of computer systems 1100 of FIG. 11, such as nodes comprising servers, network devices, switches and routers. In certain embodiments, the network 1200 may be based on a switched architecture with point-to-point links. As illustrated in FIG. 12, the network 1200 includes a plurality of switches 1204a-1204d, which may be arranged in a network. In some cases, the switches are arranged in a multi-layered network, such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 1204a-1204d may be connected to a plurality of nodes 1202a-1202h and provide multiple paths between any two nodes.

The network 1200 may also include one or more network devices for connection with other networks 1208, such as other subnets, LANs, wide area networks (WANs), or the Internet, and may be referred to as routers 1206. Routers use headers and forwarding tables to determine the best path for forwarding the packets, and use protocols such as internet control message protocol (ICMP) to communicate with each other and configure the best route between any two devices.

In some examples, network(s) 1200 may include any one or a combination of many different types of networks, such as cable networks, the Internet, wireless networks, cellular networks and other private and/or public networks. Interconnected switches 1204a-1204d and router 1206, if present, may be referred to as a switch fabric, a fabric, a network fabric, or simply a network. In the context of a computer network, terms "fabric" and "network" may be used interchangeably herein.

Nodes 1202a-1202h may be any combination of host systems, processor nodes, storage subsystems, and I/O chassis that represent user devices, service provider computers or third party computers.

User devices may include computing devices to access an application 1232 (e.g., a web browser or mobile device application). In some aspects, the application 1232 may be hosted, managed, and/or provided by a computing resources service or service provider. The application 1232 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1208. Additionally, the user device(s) may be part of the distributed system managed by, controlled by, or otherwise part of the service provider computer(s) (e.g., a console device integrated with the service provider computers).

The node(s) of FIG. 12 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1232 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s) may communicate with one or more third party computers.

In one example configuration, the node(s) 1202a-1202h may include at least one memory 1218 and one or more processing units (or processor(s) 1220). The processor(s) 1220 may be implemented in hardware, computer-executable instructions, firmware, or combinations thereof. Computer-executable instruction or firmware implementations of the processor(s) 1220 may include computer-executable or machine-executable instructions written in any suitable programming language to perform the various functions described.

In some instances, the hardware processor(s) 1220 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1218 may store program instructions that are loadable and executable on the processor(s) 1220, as well as data generated during the execution of these programs. Depending on the configuration and type of the node(s) 1202a-1202h, the memory 1218 may be volatile (such as RAM) and/or non-volatile (such as ROM, flash memory, etc.). The memory 1218 may include an operating system 1228, one or more data stores 1230, one or more applications 1232, one or more drivers 1234, and/or services for implementing the features disclosed herein.

The operating system 1228 may support nodes 1202a-1202h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1228 may also be a proprietary operating system.

The data stores 1230 may include permanent or transitory data used and/or operated on by the operating system 1228, applications 1232, or drivers 1234. Examples of such data include web pages, video data, audio data, images, user data, and so on. The information in the data stores 1230 may, in some implementations, be provided over the network(s) 1208 to user devices 1204. In some cases, the data stores 1230 may additionally or alternatively include stored application programs and/or drivers. Alternatively or additionally, the data stores 1230 may store standard and/or proprietary software libraries, and/or standard and/or proprietary application user interface (API) libraries. Information stored in the data stores 1230 may be machine-readable object code, source code, interpreted code, or intermediate code.

The drivers 1234 include programs that may provide communication between components in a node. For example, some drivers 1234 may provide communication between the operating system 1228 and additional storage 1222, network device 1224, and/or I/O device 1226. Alternatively or additionally, some drivers 1234 may provide communication between applications 1232 and the operating system 1228, and/or applications 1232 and peripheral devices accessible to the service provider computer. In many cases, the drivers 1234 may include drivers that provide well-understood functionality (e.g., printer drivers, display drivers, hard disk drivers, Solid State Device drivers). In other cases, the drivers 1234 may provide proprietary or specialized functionality.

The service provider computer(s) or servers may also include additional storage 1222, which may include removable storage and/or non-removable storage. The additional storage 1222 may include magnetic storage, optical disks, solid state disks, flash memory, and/or tape storage. The additional storage 1222 may be housed in the same chassis as the node(s) 1202a-1202h or may be in an external enclosure. The memory 1218 and/or additional storage 1222 and their associated computer-readable media may provide non-volatile storage of computer-readable instructions, data structures, program modules, and other data for the computing devices. In some implementations, the memory 1218 may include multiple different types of memory, such as SRAM, DRAM, or ROM.

The memory 1218 and the additional storage 1222, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1218 and the additional storage 1222 are examples of computer storage media. Additional types of computer storage media that may be present in the node(s) 1202*a*-1202*h* may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1202*a*-1202*h*. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1202*a*-1202*h* may also include I/O device(s) 1226, such as a keyboard, a mouse, a pen, a voice input device, a touch input device, a display, speakers, a printer, and the like. The node(s) 1202*a*-1202*h* may also include one or more communication channels 1236. A communication channel 1236 may provide a medium over which the various components of the node(s) 1202*a*-1202*h* can communicate. The communication channel or channels 1236 may take the form of a bus, a ring, a switching fabric, or a network.

The node(s) 1202*a*-1202*h* may also contain network device(s) 1224 that allow the node(s) 1202*a*-1202*h* to communicate with a stored database, another computing device or server, user terminals and/or other devices on the network(s) 1200. The network device(s) 1224 of FIG. 12 may include similar components discussed with reference to computer system 1100 of FIG. 11.

In some implementations, the network device 1224 is a peripheral device, such as a PCI-based device. In these implementations, the network device 1224 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 1108 may implement NVMe, and the network device 1224 may be connected to a computing system using a PCIe interface.

A PCI-based device may include one or more functions. A "function" describes operations that may be provided by the network device 1224. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1224 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 11, FIG. 12, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method, comprising:
   receiving, by a memory controller for a storage-class memory (SCM), a first statistics update entry and a second statistics update entry, the first statistics update entry indicating a total number of operations performed on a first memory block in the SCM during a time period, and the second statistics update entry indicating a total number of operations performed on a second memory block in the SCM during the time period;
   assembling, by the memory controller and before writing information contained in the first statistics update entry and the second statistics update entry to the SCM, the first statistics update entry and the second statistics update entry into one statistics log entry;
   writing, by the memory controller and in a single write operation, the statistics log entry including the information contained in the first statistics update entry and the second statistics update entry into a statistics log in the SCM, the statistics log forming a queue of statistics log entries that are to be processed for updating a statistics table maintained in a separate region of the SCM, wherein the statistics table comprises a plurality of table entries, each table entry being associated with a respective memory block in the SCM and including an accumulative count of operations performed on the respective memory block;
   reading, by a management controller for the SCM through the memory controller after a time delay, the statistics log entry off the queue of the statistics log, wherein the management controller is separate from the memory controller and is coupled to the SCM through the memory controller such that the management controller is configured to read from and write to the SCM through the memory controller;
   reading, by the management controller from a statistics table in the SCM, a first statistics table entry including an accumulative count of operations performed on the first memory block and a second statistics table entry including an accumulative count of operations performed on the second memory block;
   determining, by the management controller, a new value for the accumulative count of operations performed on the first memory block and a new value for the accumulative count of operations performed on the second memory block, based on the accumulative count in the first statistics table entry, the accumulative count in the second statistics table entry, and total number of operations values in the statistics log entry; and
   writing, by the management controller, the new value for the accumulative count of operations performed on the first memory block to the first statistics table entry in the SCM, and the new value for the accumulative count of operations performed on the second memory block to the second statistics table entry in the SCM.

2. The computer-implemented method of claim 1, wherein assembling the first statistics update entry and the second statistics update entry into one statistics log entry comprises:
   calculating cyclic redundancy check (CRC) bits for the first statistics update entry and CRC bits for the second statistics update entry; and
   including the CRC bits for the first statistics update entry and the CRC bits for the second statistics update entry in the statistics log entry.

3. The computer-implemented method of claim 1, wherein writing the statistics log entry into the statistics log in the SCM comprises:
   writing the statistics log entry into a memory block in the SCM, the memory block specified by the management controller.

4. The computer-implemented method of claim 1, wherein the first statistics update entry is generated by the memory controller, and wherein the second statistics update entry is generated by the management controller.

5. A computer-implemented method, comprising:
   receiving, by a memory controller for a persistent memory, a first statistics update entry and a second statistics update entry, the first statistics update entry indicating a total number of operations performed on a first memory block in the persistent memory during a time period, and the second statistics update entry indicating a total number of operations performed on a second memory block in the persistent memory during the time period;
   assembling, before writing information contained in the first statistics update entry and the second statistics update entry to the persistent memory, the first statistics update entry and the second statistics update entry into a statistics log entry;
   determining a persistent memory region in the persistent memory for storing the statistics log entry; and
   writing, in a single write operation, the statistics log entry including the information contained in the first statistics update entry and the second statistics update entry into the persistent memory region, the statistics log entry persisting in the persistent memory region until the statistics log entry is read through the memory controller, wherein the persistent memory region corresponds to a statistics log forming a queue of statistics log entries that are to be processed for updating a statistics table maintained in a separate region of the persistent memory, wherein the statistics table comprises a plurality of table entries, each table entry being associated with a respective memory block in the persistent memory and including an accumulative count of operations performed on the respective memory block, wherein the statistics table is updated based on values obtained through reading the statistics log entry off the queue together with a first table entry associated with the first memory block and a second table entry associated with the second memory block, and wherein assembling the first statistics update entry and the second statistics update entry into the statistics log entry comprises:

calculating cyclic redundancy check (CRC) bits for the first statistics update entry and CRC bits for the second statistics update entry; and adding the CRC bits for the first statistics update entry to the first statistics update entry in the statistics log entry and adding the CRC bits for the second statistics update entry to the second statistics update entry in the statistics log entry.

6. The computer-implemented method of claim 5, wherein:

the first statistics update entry is generated by the memory controller, and wherein the second statistics update entry is generated by a management controller communicatively coupled to the memory controller.

7. The computer-implemented method of claim 5, wherein receiving the first statistics update entry and the second statistics update entry comprises:

receiving the first statistics update entry and the second statistics update entry from an Advanced eXtensible Interface (AXI) or from control and status registers (CSRs).

8. The computer-implemented method of claim 5, further comprising:

determining that writing the statistics log entry into the persistent memory region is unsuccessful;

determining a new persistent memory region in the persistent memory for storing the statistics log entry; and writing the statistics log entry into the new persistent memory region.

9. The computer-implemented method of claim 5, further comprising:

reading the statistics log entry from the persistent memory;

performing a CRC check using the CRC bits for a statistics update entry in the statistics log entry; and setting, when the CRC check fails, a bit in the statistics log entry to indicate a CRC failure for the statistics log entry.

10. The computer-implemented method of claim 9, further comprising:

receiving, by a management controller, the statistics log entry;

determining, by the management controller, that the statistics log entry includes a bit indicating a CRC failure; and skipping, by the management controller, the statistics log entry from statistics data processing.

11. The computer-implemented method of claim 5, wherein a number of bytes of the statistics log entry is equal to a number of bytes in an individually addressable region of the persistent memory.

12. The computer-implemented method of claim 5, further comprising:

receiving a list of memory blocks in the persistent memory, wherein each memory block in the list of memory blocks is a memory block allocated to the statistics log; and storing the list of memory blocks in a first-in first-out buffer (FIFO), wherein determining the persistent memory region in the persistent memory for storing the statistics log entry comprises determining the persistent memory region in the persistent memory for storing the statistics log entry based on an address of a memory block in the list of memory blocks in the FIFO.

13. The computer-implemented method of claim 5, further comprising:

reading the statistics log entry from the persistent memory after a time delay;

determining the total number of operations performed on the first memory block during the time period and the total number of operations performed on the second memory block during the time period, based on the statistics log entry;

reading the first table entry and the second table entry from the statistics table;

computing a new value for an accumulative count in the first table entry as a sum of the total number of operations performed on the first memory block during the time period and an existing accumulative count value in the first table entry;

computing a new value for an accumulative count in the second table entry as a sum of the total number of operations performed on the second memory block during the time period and an existing accumulative count value in the second table entry;

writing the new value for the accumulative count in the first table entry to the first table entry; and writing the new value for the accumulative count in the second table entry to the second table entry.

14. A system comprising:

a memory controller configured to:

receive a first statistics update entry and a second statistics update entry, the first statistics update entry indicating a total number of operations performed on a first memory block in a persistent memory during a time period, and the second statistics update entry indicating a total number of operations performed on a second memory block in the persistent memory during the time period;

calculate cyclic redundancy check (CRC) bits for the first statistics update entry and CRC bits for the second statistics update entry;

assemble, before writing information contained in the first statistics update entry and the second statistics update entry to the persistent memory, the first statistics update entry and the second statistics update entry into a statistics log entry, wherein the statistics log entry includes the CRC bits for the first statistics update entry and the CRC bits for the second statistics update entry;
determine a persistent memory region in the persistent memory for storing the statistics log entry; and
write, in a single write operation, the statistics log entry including the information contained in the first statistics update entry and the second statistics update entry into the persistent memory region, the statistics log entry persisting in the persistent memory region until the statistics log entry is read through the memory controller,
wherein the persistent memory region corresponds to a statistics log forming a queue of statistics log entries that are to be processed for updating a statistics table maintained in a separate region of the persistent memory,
wherein the statistics table comprises a plurality of table entries, each table entry being associated with a respective memory block in the persistent memory and including an accumulative count of operations performed on the respective memory block, and
wherein the statistics table is updated based on values obtained through reading the statistics log entry off the queue together with a first table entry associated with the first memory block and a second table entry associated with the second memory block.

15. The system of claim 14, wherein the memory controller is further configured to:
determine that writing the statistics log entry into the persistent memory region is unsuccessful;
determine a new persistent memory region in the persistent memory for storing the statistics log entry; and
write the statistics log entry into the new persistent memory region.

16. The system of claim 14, wherein the memory controller is further configured to:
read the statistics log entry from the persistent memory;
perform a CRC check using the CRC bits for a statistics update entry in the statistics log entry; and
set, when the CRC check fails, a bit in the statistics log entry to indicate a CRC failure for the statistics log entry.

17. The system of claim 14, wherein the memory controller is further configured to:
receive a list of memory blocks in the persistent memory for storing statistics log entries, wherein each memory block in the list of memory blocks is a memory block allocated to the statistics log; and
store the list of memory blocks in a first-in first-out buffer (FIFO),
wherein determining the persistent memory region in the persistent memory for storing the statistics log entry comprises determining the persistent memory region in the persistent memory for storing the statistics log entry based on an address of a memory block in the list of memory blocks in the FIFO.

18. The system of claim 14, wherein:
the persistent memory is part of a storage class memory (SCM).

* * * * *